US011412163B2

United States Patent
Kobayashi

(10) Patent No.: US 11,412,163 B2
(45) Date of Patent: Aug. 9, 2022

(54) IMAGING DEVICE, IMAGING SYSTEM, AND MOBILE APPARATUS HAVING CONTROL SIGNAL LINES SUPPLYING CONTROL SIGNALS TO RESPECTIVE PIXELS

(71) Applicant: CANON KABUSHIKI KAISHA, Tokyo (JP)

(72) Inventor: Masahiro Kobayashi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/431,406

(22) Filed: Jun. 4, 2019

(65) Prior Publication Data

US 2019/0387189 A1 Dec. 19, 2019

(30) Foreign Application Priority Data

Jun. 14, 2018 (JP) .............................. JP2018-113789

(51) Int. Cl.
*H04N 5/355* (2011.01)
*H04N 5/376* (2011.01)
(Continued)

(52) U.S. Cl.
CPC ........... *H04N 5/3559* (2013.01); *B60R 11/04* (2013.01); *G02B 5/201* (2013.01);
(Continued)

(58) Field of Classification Search
None
See application file for complete search history.

(56) References Cited

U.S. PATENT DOCUMENTS 7,462,810 B2  12/2008  Kobayashi
7,928,477 B2   4/2011  Kobayashi
(Continued)

FOREIGN PATENT DOCUMENTS

CN  103297723 A  9/2013
CN  103297724 A  9/2013
(Continued)

OTHER PUBLICATIONS

U.S. Appl. No. 16/365,952, filed Mar. 27, 2019, by Yosuke Nishide et al.
(Continued)

*Primary Examiner* — Quan Pham
(74) *Attorney, Agent, or Firm* — Venable LLP

(57) ABSTRACT

Provided is an imaging device including a plurality of pixels each including a first photoelectric conversion unit that one pupil-divided part of an incident light enters and a second photoelectric conversion unit that another pupil-divided part of the incident light enters, each of the plurality of pixels is configured to output a first signal based on charges generated by the first photoelectric conversion unit and a second signal based on at least charges generated by the second photoelectric conversion unit in one frame period, the plurality of pixels includes a first pixel and a second pixel that are arranged on columns different from each other and arranged on a single row, and the first pixel and the second pixel are subjected to different control from each other in the one frame period.

13 Claims, 14 Drawing Sheets

(51) Int. Cl.
*B60R 11/04* (2006.01)
*G02B 5/20* (2006.01)
*H04N 5/378* (2011.01)
*H04N 5/3745* (2011.01)

(52) U.S. Cl.
CPC ......... *H04N 5/35554* (2013.01); *H04N 5/376* (2013.01); *H04N 5/378* (2013.01); *H04N 5/37457* (2013.01)

(56) References Cited

U.S. PATENT DOCUMENTS

| | | | |
|---|---|---|---|
| 7,935,995 B2 | 5/2011 | Watanabe | |
| 8,045,034 B2 | 10/2011 | Shibata | |
| 8,063,351 B2 | 11/2011 | Kobayashi | |
| 8,174,604 B2 | 5/2012 | Shibata | |
| 8,222,682 B2 | 7/2012 | Watanabe | |
| 8,259,206 B1 | 9/2012 | Shibata | |
| 8,289,432 B2 | 10/2012 | Shibata | |
| 8,357,956 B2 | 1/2013 | Kobayashi | |
| 8,456,559 B2 | 6/2013 | Yamashita | |
| 8,552,353 B2 | 10/2013 | Kobayashi | |
| 8,723,232 B2 | 5/2014 | Kobayashi | |
| 8,884,391 B2 | 11/2014 | Fudaba | |
| 9,147,708 B2 | 9/2015 | Okita | |
| 9,153,610 B2 | 10/2015 | Kobayashi | |
| 9,225,923 B2 | 12/2015 | Hashimoto | |
| 9,276,027 B2 | 3/2016 | Okita | |
| 9,344,653 B2 | 5/2016 | Shimotsusa | |
| 9,419,038 B2 | 8/2016 | Kobayashi | |
| 9,445,026 B2 | 9/2016 | Kobayashi | |
| 9,538,112 B2 | 1/2017 | Wada | |
| 9,548,328 B2 | 1/2017 | Hasegawa | |
| 9,716,849 B2 | 7/2017 | Kobayashi | |
| 9,768,213 B2 | 9/2017 | Soda | |
| 9,818,794 B2 | 11/2017 | Okita | |
| 9,876,975 B2 | 1/2018 | Yoshida | |
| 9,894,295 B2 | 2/2018 | Kawabata | |
| 9,906,743 B2 | 2/2018 | Shimotsusa | |
| 10,009,560 B2 | 6/2018 | Kobayashi | |
| 10,021,321 B2 | 7/2018 | Kawabata | |
| 10,057,519 B2 | 8/2018 | Kobayashi | |
| 10,158,817 B2 | 12/2018 | Shimotsusa | |
| 10,186,532 B2 | 1/2019 | Kobayashi | |
| 10,205,894 B2 | 2/2019 | Kawabata | |
| 10,283,546 B2 | 5/2019 | Kobayashi | |
| 10,321,087 B2 | 6/2019 | Yoshida | |
| 2005/0151866 A1 | 7/2005 | Ando | |
| 2013/0001403 A1* | 1/2013 | Yamakawa | H01L 27/14609 250/208.1 |
| 2014/0061436 A1 | 3/2014 | Kobayashi | |
| 2015/0350574 A1* | 12/2015 | Okado | H04N 5/378 348/308 |
| 2016/0173799 A1 | 6/2016 | Akabori | |
| 2016/0286108 A1 | 9/2016 | Fettig | |
| 2016/0316163 A1* | 10/2016 | Beck | H04N 5/3559 |
| 2017/0359538 A1 | 12/2017 | Kobayashi | |
| 2018/0026073 A1 | 1/2018 | Tsuboi | |
| 2018/0069045 A1* | 3/2018 | Kato | H01L 27/14645 |
| 2018/0115730 A1* | 4/2018 | Velichko | H04N 5/3559 |
| 2018/0151616 A1 | 5/2018 | Sekine | |
| 2018/0213167 A1 | 7/2018 | Miki | |
| 2018/0277575 A1 | 9/2018 | Ikeda | |
| 2018/0295302 A1 | 10/2018 | Kobayashi | |
| 2018/0309946 A1 | 10/2018 | Ohya | |
| 2018/0343404 A1* | 11/2018 | Hwang | H04N 5/3745 |
| 2018/0374886 A1 | 12/2018 | Iwata | |
| 2019/0037161 A1 | 1/2019 | Ikeda | |
| 2019/0068903 A1 | 2/2019 | Shimotsusa | |
| 2019/0132533 A1 | 5/2019 | Kawabata | |
| 2019/0191109 A1* | 6/2019 | Mo | H04N 5/345 |
| 2019/0214415 A1 | 7/2019 | Kobayashi | |

FOREIGN PATENT DOCUMENTS

| | | |
|---|---|---|
| CN | 105049755 A | 11/2015 |
| CN | 105100650 A | 11/2015 |
| JP | 2001-088609 A | 4/2001 |
| JP | 2013-211833 | 10/2013 |

OTHER PUBLICATIONS

U.S. Appl. No. 16/262,043, filed Jan. 30, 2019, by Masahiro Kobayashi et al.

Chinese Office Action dated Nov. 29, 2021 during prosecution of related Chinese Application No. 201910514063.1 (with English language translation).

Japanese Office Action dated Apr. 7, 2022 during prosecution of related Japanese Application No. 2018113789 (with English language translation).

\* cited by examiner

FIG. 6

| R | G | R | G | ⌇CF
|---|---|---|---|
| G | B | G | B |
| R | G | R | G |
| G | B | G | B |

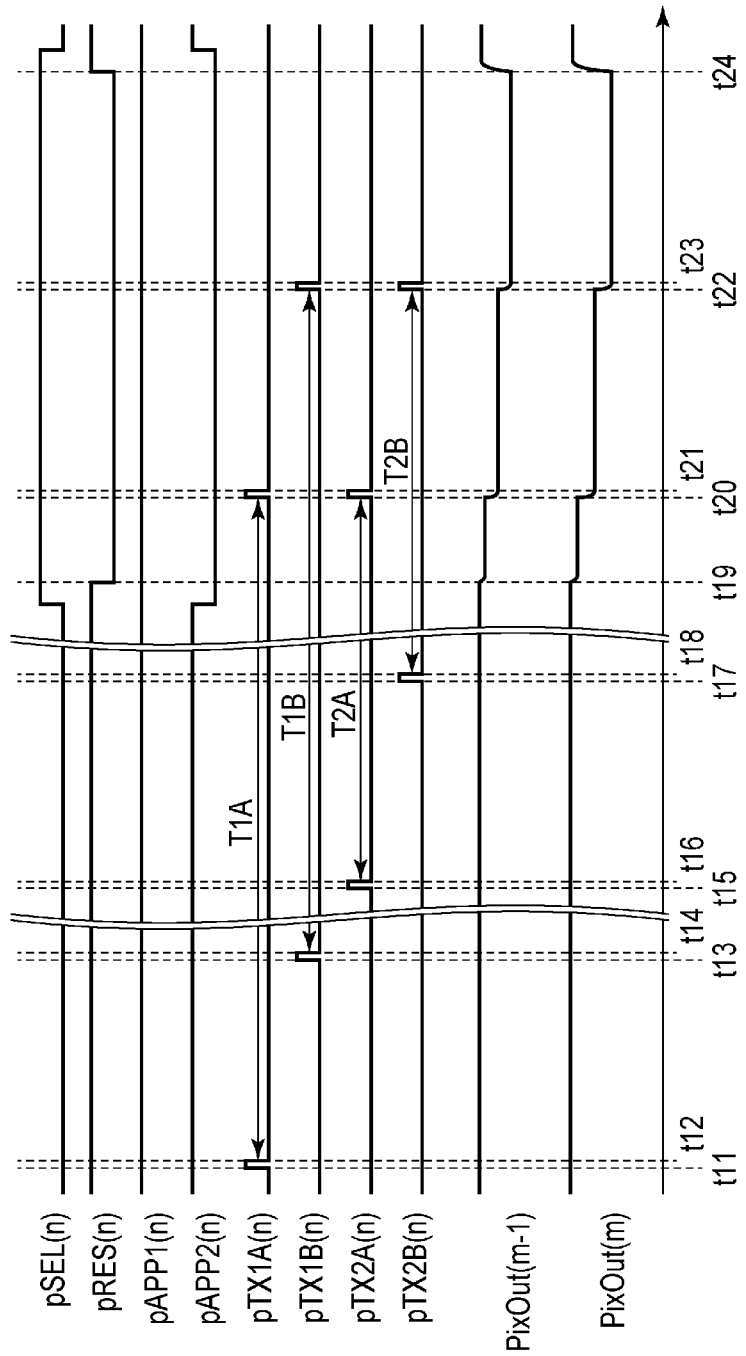

IMAGING DEVICE, IMAGING SYSTEM, AND MOBILE APPARATUS HAVING CONTROL SIGNAL LINES SUPPLYING CONTROL SIGNALS TO RESPECTIVE PIXELS

BACKGROUND OF THE INVENTION

Field of the Invention

The present invention relates to an imaging device, an imaging system, and a mobile apparatus.

Description of the Related Art

Japanese Patent Application Laid-Open No. 2013-211833 discloses an imaging device that can perform capturing and focus detection of a phase difference detection scheme by providing a plurality of photoelectric conversion units in a single pixel. The imaging device of Japanese Patent Application Laid-Open No. 2013-211833 is configured to increase a rate of signal acquisition by reducing the number of output signals that are based on only some of the photoelectric conversion units of the plurality of photoelectric conversion units.

In an imaging device as disclosed in Japanese Patent Application Laid-Open No. 2013-211833, there is a demand for higher functionality.

SUMMARY OF THE INVENTION

The present invention intends to provide an imaging device that may realize higher functionality with another configuration.

According to one aspect of the present invention, provided is an imaging device including: a plurality of pixels arranged to form a plurality of rows and a plurality of columns, each of the plurality of pixels including a first photoelectric conversion unit that one pupil-divided part of an incident light enters and a second photoelectric conversion unit that another pupil-divided part of the incident light enters; and a readout circuit configured to read out signals output from the plurality of pixels, the readout circuit being provided for each column or each column group of the plurality of columns. Each of the plurality of pixels is configured to output a first signal based on charges generated by the first photoelectric conversion unit and a second signal based on at least charges generated by the second photoelectric conversion unit in one frame period. The plurality of pixels includes a first pixel and a second pixel that are arranged on columns different from each other and arranged on a single row. An accumulation time in which charges are accumulated for obtaining one of the first signal and the second signal of the first pixel and an accumulation time in which charges are accumulated for obtaining corresponding one of the first signal and the second signal of the second pixel are different from each other in the one frame period.

According to another aspect of the present invention, provided is an imaging device including: a plurality of pixels arranged to form a plurality of rows and a plurality of columns, each of the plurality of pixels including a first photoelectric conversion unit that one pupil-divided part of an incident light enters and a second photoelectric conversion unit that another pupil-divided part of the incident light enters; and a readout circuit configured to read out signals output from the plurality of pixels, the readout circuit being provided for each column or each column group of the plurality of columns. Each of the plurality of pixels is configured to output a first signal based on charges generated by the first photoelectric conversion unit and a second signal based on charges generated by the first photoelectric conversion unit and charges generated by the second photoelectric conversion unit in one frame period. The plurality of pixels includes a first pixel and a second pixel that are arranged on columns different from each other and arranged on a single row. In the one frame period, the first pixel outputs the first signal and the second signal, separately. In the one frame period, the second pixel does not output the first signal but outputs the second signal in accordance with a control signal different from a control signal supplied to the first pixel.

According to yet another aspect of the present invention, provided is an imaging device including: a plurality of pixels arranged to form a plurality of rows and a plurality of columns, each of the plurality of pixels including a first photoelectric conversion unit that one pupil-divided part of an incident light enters and a second photoelectric conversion unit that another pupil-divided part of the incident light enters; and a readout circuit configured to read out signals output from the plurality of pixels, the readout circuit being provided for each column or each column group of the plurality of columns. Each of the plurality of pixels is configured to output a first signal based on charges generated by the first photoelectric conversion unit and a second signal based on charges generated by the first photoelectric conversion unit and the second photoelectric conversion unit in one frame period. The plurality of pixels includes a first pixel and a second pixel that are arranged on columns different from each other and arranged on a single row. Each of the first pixel and the second pixel further includes an amplification unit having an input node and configured to output a signal based on charges transferred to the input node, and a capacitance control unit configured to change a capacitance value of the input node in accordance with a control signal. A capacitance value of the input node of the first pixel and a capacitance value of the input node of the second pixel are controlled to values different from each other in the one frame period.

Further features of the present invention will become apparent from the following description of exemplary embodiments with reference to the attached drawings.

BRIEF DESCRIPTION OF THE DRAWINGS

FIG. 6 is an arrangement diagram of color filters according to the third embodiment of the present invention.

FIG. 10A and FIG. 10B are timing diagrams illustrating a drive method of an imaging device according to the sixth embodiment of the present invention.

DESCRIPTION OF THE EMBODIMENTS

Preferred embodiments of the present invention will now be described in detail in accordance with the accompanying drawings. Corresponding elements throughout a plurality of drawings are labeled with a common reference, and the description thereof may be omitted or simplified.

First Embodiment

Figure 1:
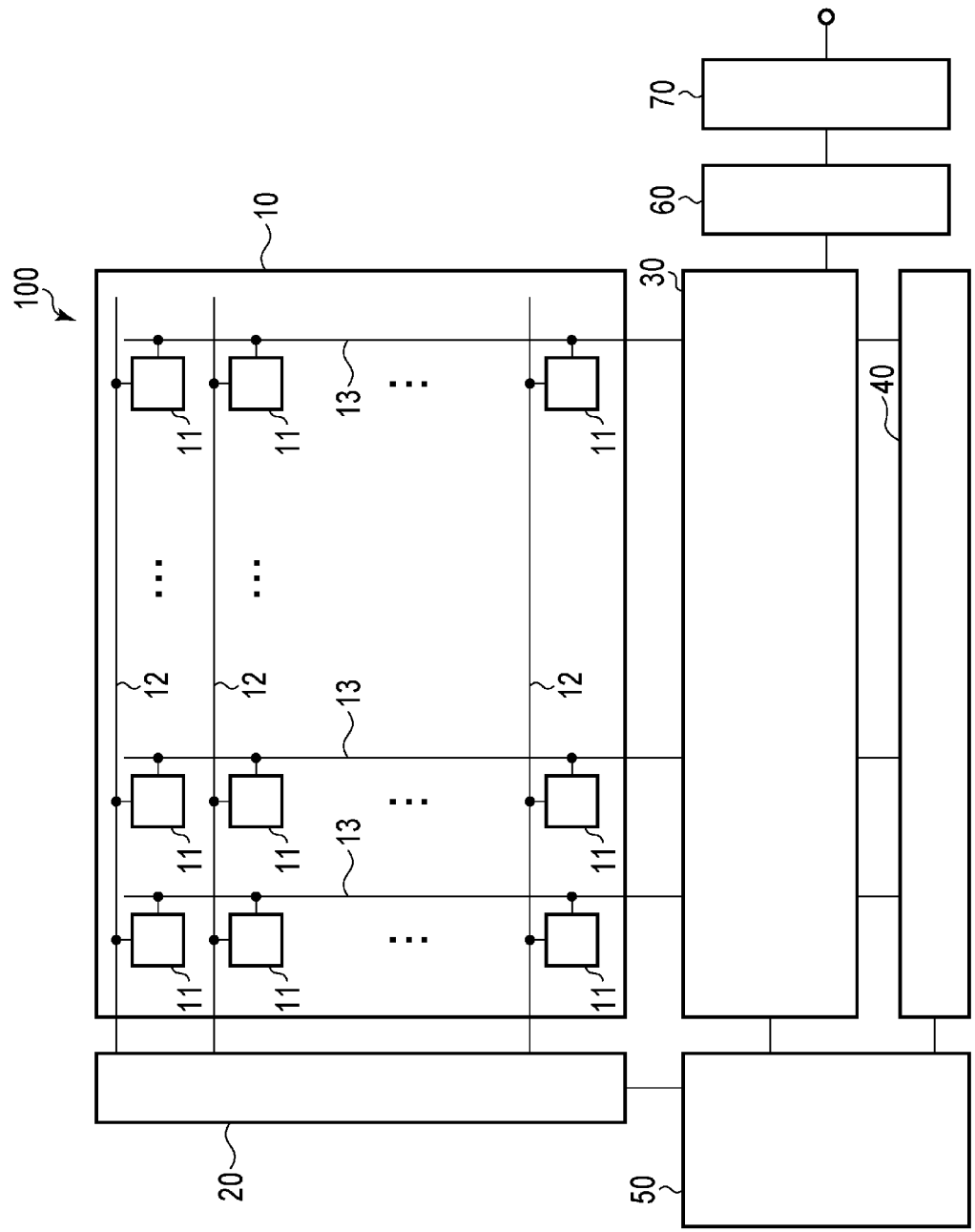
FIG. 1 is a block diagram illustrating a general configuration of an imaging device according to a first embodiment of the present invention.

FIG. 1 is a block diagram illustrating a general configuration of an imaging device 100 according to a first embodiment of the present invention. The imaging device 100 has a pixel array 10, a vertical scanning circuit 20, a readout circuit 30, a horizontal scanning circuit 40, a timing generator (hereafter, referred to as a "TG") 50, a digital signal processor (hereafter, referred to as a "DSP") 60, and an output circuit 70.

The pixel array 10 has a plurality of pixels 11 arranged to form a plurality of rows and a plurality of columns. Each of the plurality of pixels 11 has a plurality of photoelectric conversion units that generate charges in accordance with an incident light.

The vertical scanning circuit 20 is a circuit that outputs a plurality of control signals that cause each of the plurality of pixels 11 to output a signal. The plurality of control signals is supplied to the pixels 11 via control signal line groups 12 provided for respective rows of the pixel array 10. Note that, while the control signal line group 12 corresponding to each row is illustrated by a single line in FIG. 1, the control signal line group 12 is formed of a plurality of control signal lines in the actual implementation.

Signals output from the pixels 11 are input to the readout circuit 30 via vertical output lines 13 provided for respective columns of the pixel array 10. The readout circuit 30 is a circuit that reads out signals output from the pixels 11 on a column basis and performs processing such as amplification, analog-to-digital (AD) conversion, correlated double sampling, or the like.

The horizontal scanning circuit 40 is a circuit that supplies, to the readout circuit 30, control signals used for transferring signals processed in the readout circuit 30 to the DSP 60 sequentially on a column basis. The DSP 60 performs predetermined digital signal processing on an input signal and outputs the input signal to the output circuit 70. The output circuit 70 outputs a signal input from the DSP 60 to the outside of the imaging device 100.

The TG 50 is a circuit that supplies control signals used for control of operation timings or the like to the vertical scanning circuit 20, the readout circuit 30, and the horizontal scanning circuit 40. While FIG. 1 illustrates control signals used for controlling the vertical scanning circuit 20, the readout circuit 30, and the horizontal scanning circuit 40 as being supplied from the TG 50, some or all of such control signals may be supplied from the outside of the imaging device 100.

Figure 2:
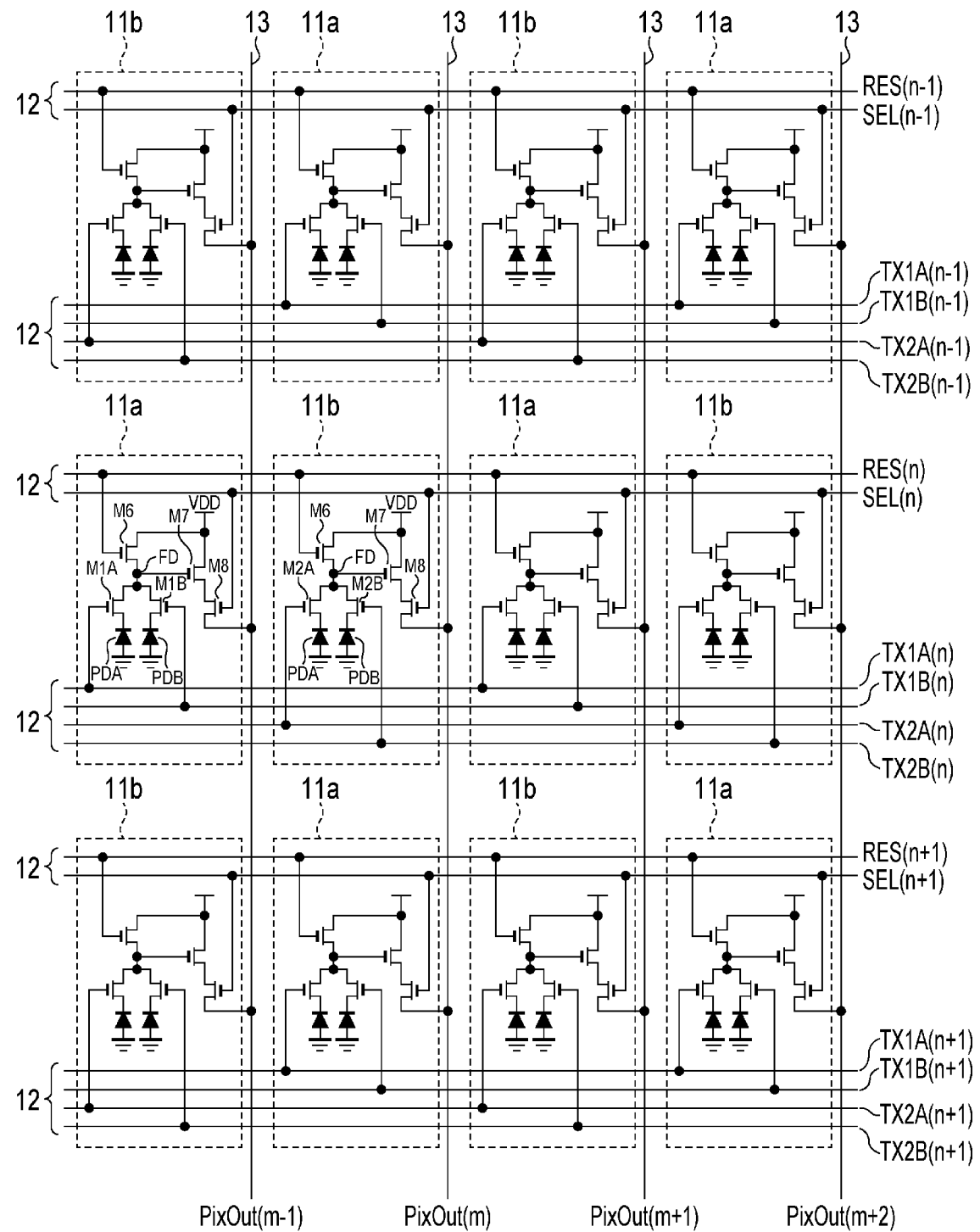
FIG. 2 is a circuit diagram illustrating a configuration of a pixel array according to the first embodiment of the present invention.

FIG. 2 is a circuit diagram illustrating a configuration of the pixel array 10 according to the present embodiment. While FIG. 2 illustrates 12 pixels 11a and 11b arranged in 3 rows by 4 columns of the pixel array 10, the pixel array 10 may include more pixels 11a and 11b in general. In the following description, three rows illustrated in FIG. 2 are defined as the (n−1)-th row, the n-th row, and the (n+1)-th row in the pixel array 10, and four columns illustrated in FIG. 2 are defined as the (m−1)-th column, the m-th column, the (m+1)-th column, and the (m+2)-th column in the pixel array 10.

Here, the pixels 11a and 11b in FIG. 2 correspond to the pixels 11 in FIG. 1, and the pixel 11a and the pixel 11b are different from each other in a connection relationship with respect to the control signal line group 12. As illustrated in FIG. 2, the pixels 11a and the pixels 11b are alternately arranged on the same column. Further, the pixels 11a and the pixels 11b are alternately arranged also on the same row.

The configuration of the pixel 11a (a first pixel) arranged at the n-th row, the (m−1)-th column and the pixel 11b (a second pixel) arranged at the n-th row, the m-th column will be described. Since other pixels 11a and 11b have the same configuration, the description thereof will be omitted.

First, the configuration of the pixel 11a will be described. The pixel 11a has photoelectric conversion units PDA and PDB, transfer transistors M1A and M1B, a reset transistor M6, an amplification transistor M7, and the select transistor M8.

The photoelectric conversion unit PDA (a first photoelectric conversion unit) and the photoelectric conversion unit PDB (a second photoelectric conversion unit) are each formed of a photodiode, for example. The anodes of the photoelectric conversion units PDA and PDB are connected to a ground voltage line. The cathode of the photoelectric conversion unit PDA is connected to the source of the transfer transistor M1A, and the cathode of the photoelectric conversion unit PDB is connected to the source of the transfer transistor M1B. Lights that have passed through regions of different exit pupils in an imaging optical system enter the photoelectric conversion unit PDA and the photoelectric conversion unit PDB. In other words, one pupil-divided part of an incident light enters the photoelectric conversion unit PDA, and another pupil-divided part of the incident light enters the photoelectric conversion unit PDB.

The drains of the transfer transistors M1A and M1B are connected to the source of the reset transistor M6 and the gate of the amplification transistor M7. The node at which the drains of the transfer transistors M1A and M1B, the source of the reset transistor M6, and the gate of the amplification transistor M7 are connected to each other is a floating diffusion region FD. The floating diffusion region FD has a function of holding charges transferred by the transfer transistors M1A and M1B.

The drain of the reset transistor M6 and the drain of the amplification transistor M7 are connected to a power source voltage line VDD. The source of the amplification transistor M7 is connected to the drain of the select transistor M8. The source of the select transistor M8 is connected to the vertical output line 13.

Next, the configuration of the pixel 11b will be described. The pixel 11b is a pixel arranged adjacent to the pixel 11a.

For example, on the same n-th row, the pixel 11b is arranged on the m-th column that is the adjacent column of the (m−1)-th column on which the pixel 11a is arranged. The pixel 11b has photoelectric conversion units PDA and PDB, transfer transistors M2A and M2B, a reset transistor M6, an amplification transistor M7, and the select transistor M8. Since the connection relationship of elements in the pixel 11b is the same as that in the pixel 11a except for a connection relationship between the transfer transistors M2A and M2B and the control signal line group 12, the description thereof will be omitted.

On each row of the pixel array 10, the control signal line group 12 extending in the row direction (the horizontal direction in FIG. 2) is arranged. The control signal line group 12 on each row includes control signal lines TX1A, TX1B, TX2A, TX2B, RES, and SEL.

The control signal line TX1A is connected to the gates of the transfer transistors M1A of the pixels 11a aligned on the same row, respectively, and forms a signal line common to these pixels 11a. The control signal line TX1B is connected to the gates of the transfer transistors M1B of the pixels 11a aligned in the row direction, respectively, and forms a signal line common to these pixels 11a.

The control signal line TX2A is connected to the gates of the transfer transistors M2A of the pixels 11b aligned on the same row, respectively, and forms a signal line common to these pixels 11b. The control signal line TX2B is connected to the gates of the transfer transistors M2B of the pixels 11b aligned in the row direction, respectively, and forms a signal line common to these pixels 11b.

The control signal line RES is connected to the gates of the reset transistors M6 of the pixels 11a and 11b aligned in the row direction, respectively, and forms a signal line common to these pixels 11a and 11b. The control signal line SEL is connected to the gates of the select transistors M8 of the pixels 11a and 11b aligned in the row direction, respectively, and forms a signal line common to these pixels 11a and 11b.

Note that, in FIG. 2, control signal lines for respective rows are distinguished by providing corresponding row numbers to the names of respective control signal lines, respectively (for example, TX1A (n), TX1A(n+1)). Such a denotation scheme is similarly applied to FIG. 3 and subsequent drawings.

The control signal lines TX1A, TX1B, TX2A, TX2B, RES, and SEL are connected to the vertical scanning circuit 20. A control signal pTX1A used for controlling the transfer transistor M1A is output to the control signal line TX1A from the vertical scanning circuit 20. A control signal pTX1B used for controlling the transfer transistor M1B is output to the control signal line TX1B from the vertical scanning circuit 20. A control signal pTX2A used for controlling the transfer transistor M2A is output to the control signal line TX2A from the vertical scanning circuit 20. A control signal pTX2B used for controlling the transfer transistor M2B is output to the control signal line TX2B from the vertical scanning circuit 20. A control signal pRES used for controlling the reset transistor M6 is output to the control signal line RES from the vertical scanning circuit 20. A control signal pSEL used for controlling the select transistor M8 is output to the control signal line SEL from the vertical scanning circuit 20.

In a typical example, when a high level control signal is output from the vertical scanning circuit 20, the corresponding transistor is turned on, and when a low level control signal is output from the vertical scanning circuit 20, the corresponding transistor is turned off. The vertical scanning circuit 20 supplies the above control signals in response to predetermined timing signals output from the TG 50. A logic circuit of shift register, an address decoder, or the like is used for the vertical scanning circuit 20.

On each column of the pixel array 10, the vertical output line 13 extending in the column direction (the vertical direction in FIG. 2) is arranged. The vertical output line 13 is connected to the sources of the select transistors M8 of the pixels 11a and 11b aligned in the column direction, respectively, and forms a signal line common to these pixels 11a and 11b. Note that the select transistors M8 of the pixels 11a and 11b may be omitted. In this case, the vertical output line 13 is connected to the source of the amplification transistor M7. Each of the vertical output lines 13 is connected to a current source (not illustrated).

Each of the photoelectric conversion units PDA and PDB generates charges in accordance with an incident light by photoelectric conversion and accumulates the generated charges. The transfer transistor M1A and M2A transfer charges accumulated in the photoelectric conversion unit PDA to the floating diffusion region FD. The transfer transistors M1B and M2B transfer charges accumulated in the photoelectric conversion unit PDB to the floating diffusion region FD.

The reset transistor M6 resets the potentials of the floating diffusion region FD and the photoelectric conversion units PDA and PDB. The select transistor M8 selects the pixels 11a and 11b which output signals to the vertical output line 13. The amplification transistor M7 is configured such that a power source voltage is supplied to the drain and a bias current is supplied to the source from a current source via the select transistor M8. Thereby, the amplification transistor M7 forms an amplification unit, or an amplifier, (a source follower circuit) whose input node is the gate connected to the floating diffusion region FD. In such a way, the amplification transistor M7 outputs, to the vertical output line 13, an output signal PixOut based on charges generated by an incident light. Note that, in FIG. 2, output signals on respective columns are distinguished by providing corresponding column numbers to the output signals PixOut, respectively (for example, PixOut(m−1), PixOut(m)). Such a denotation scheme is similarly applied to FIG. 3 and subsequent drawings.

Figure 3:
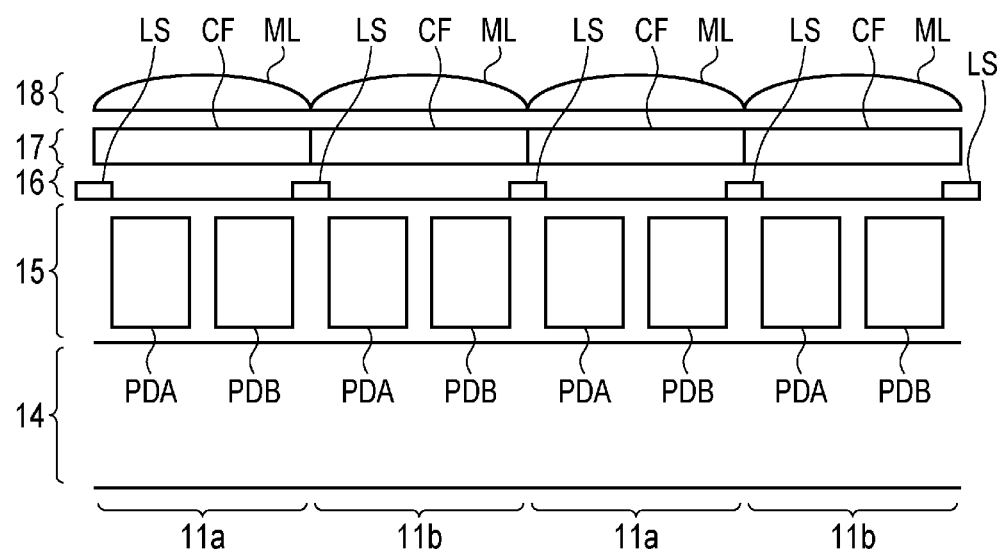
FIG. 3 is a schematic sectional view of the pixel array according to the first embodiment of the present invention.

FIG. 3 is a schematic sectional view of the pixel array 10 according to the present embodiment. In the sectional view illustrated in FIG. 3, a wiring layer 14, a photoelectric conversion layer 15, a light shield portion forming layer 16, a color filter forming layer 17, and a micro-lens forming layer 18 are depicted. The photoelectric conversion layer 15 is formed of a semiconductor substrate such as a silicon substrate. The photoelectric conversion units PDA and PDB such as photodiodes are formed in the photoelectric conversion layer 15.

As illustrated in FIG. 3, the wiring layer 14 is formed below the photoelectric conversion layer 15 (the front side of the substrate). Further, the light shield portion forming layer 16, the color filter forming layer 17, and the micro-lens forming layer 18 are formed in this order above the photoelectric conversion layer 15 (the backside of the substrate).

The wiring layer 14 is a layer in which wirings such as the control signal line group 12, the vertical output line 13, or the like are formed. The light shield portion forming layer 16 is a layer in which a plurality of light shield portions LS is formed. The color filter forming layer 17 is a layer in which a plurality of color filters CF is formed. The micro-lens forming layer 18 is a layer in which a plurality of micro lenses ML is formed. Note that a planarization layer (not illustrated) may be further formed between respective layers.

Each light shield portion LS is arranged at a position corresponding to a part between pixels in a plan view and has a function of suppressing an incident light from entering the adjacent pixel. Thereby, image quality deterioration due to color mixture is reduced. Each color filter CF is arranged for each of the corresponding pixels 11a and 11b and has predetermined spectral characteristics with respect to an incident light. Thereby, the color filter CF has a function of causing a light of a particular wavelength of an incident light to transmit. Each micro-lens ML is arranged for each of the corresponding pixels 11a and 11b and has a function of improving sensitivity by converging an incident light on the photoelectric conversion unit PDA or PDB.

With the configuration described above, each of the pixels 11a and 11b receives an incident light from the micro-lens forming layer 18 side and outputs an electric signal. That is, the imaging device 100 of the present embodiment is a so-called backside irradiation type image sensor that can detect a light emitted to a surface that is opposite to a surface on which the wiring layer 14 is provided. In the backside irradiation type, since wirings can be formed on the opposite side of the side through which an incident light passes, flexibility in design of wirings is high. In the imaging device 100 of the present embodiment, since the number of control signal lines tends to increase, it is desirable to employ the backside irradiation type in terms of easier design of wiring and a smaller element area. However, the configuration of the imaging device 100 is not limited to the backside irradiation type and may be a front side irradiation type that can detect a light emitted from the surface on which the wiring layer 14 is provided.

Figure 4A:
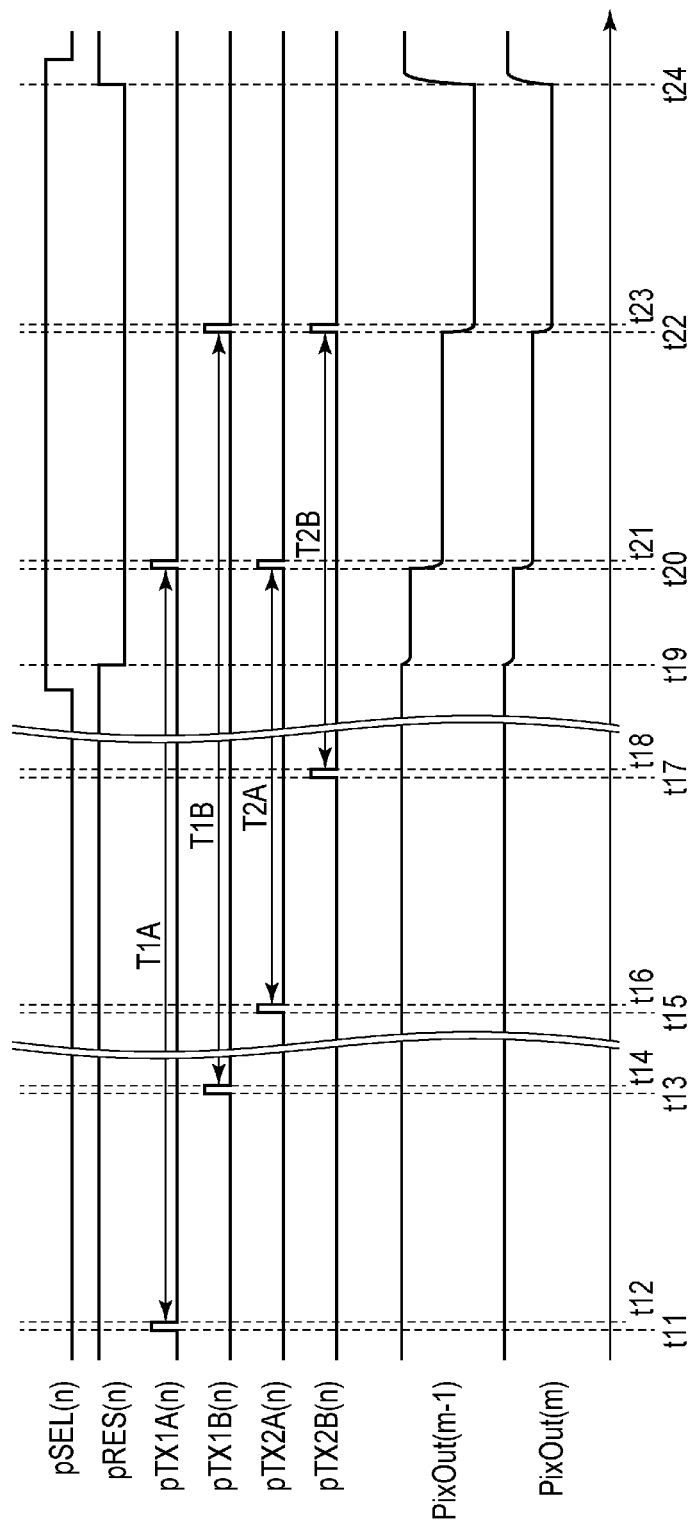
FIG. 4A and FIG. 4B are timing diagrams illustrating a drive method of the imaging device according to the first embodiment and a second embodiment of the present invention.

FIG. 4A is a timing diagram illustrating a drive method of the imaging device 100 according to the present embodiment. FIG. 4A illustrates control signals and output signals related to the pixels 11a and 11b on the n-th row in one frame period of the imaging device 100. More specifically, FIG. 4A illustrates the control signals pSEL(n), pRES(n), pTX1A(n), pTX1B(n), pTX2A(n), and pTX2B(n) supplied to the pixels 11a and 11b on the n-th row. Further, FIG. 4A illustrates the output signal PixOut(m−1) output from the vertical output line 13 on the (m−1)-th column and the output signal PixOut(m) output from the vertical output line 13 on the m-th column. With reference to FIG. 4A, the operation of the imaging device 100 will be described.

In the period before time t11, the control signal pSEL(n) is at a low level, the select transistor M8 is in an off-state, and the pixels 11a and 11b on the n-th row are in not-selected state. Further, in the same period as above, the control signal pRES(n) is at a high level, the reset transistor M6 is in an on-state, and the floating diffusion region FD is at a reset state potential. Further, the control signals pTX1A(n), pTX1B(n), pTX2A(n), and pTX2B(n) are all at a low level.

At the time t11, the control signal pTX1A(n) transitions to the high level, and the transfer transistor M1A is turned on. Then, at time t12, the control signal pTX1A(n) transitions to the low level, and the transfer transistor M1A is turned off. By this operation, the photoelectric conversion unit PDA of the pixel 11a is reset. The photoelectric conversion unit PDA of the pixel 11a then starts accumulating charges based on an incident light from the time t12.

At time t13, the control signal pTX1B(n) transitions to the high level, and the transfer transistor M1B is turned on. Then, at time t14, the control signal pTX1B(n) transitions to the low level, and the transfer transistor M1B is turned off. This operation resets the photoelectric conversion unit PDB of the pixel 11a. The photoelectric conversion unit PDB of the pixel 11a then starts accumulating charges based on an incident light from the time t14.

At time t15, the control signal pTX2A(n) transitions to the high level, and the transfer transistor M2A is turned on. Then, at time t16, the control signal pTX2A(n) transitions to the low level, and the transfer transistor M2A is turned off. This operation resets the photoelectric conversion unit PDA of the pixel 11b. The photoelectric conversion unit PDA of the pixel 11b then starts accumulating charges based on an incident light from the time t16.

At the time t17, the control signal pTX2B(n) transitions to the high level, and the transfer transistor M2B is turned on. Then, at time t18, the control signal pTX2B(n) transitions to the low level, and the transfer transistor M2B is turned off. This operation resets the photoelectric conversion unit PDB of the pixel 11b. The photoelectric conversion unit PDB of the pixel 11b then starts accumulating charges based on an incident light from the time t18.

After the time t18, the control signal pSEL(n) transitions to the high level, and the select transistor M8 is turned on. This results in a state where the pixels 11a and 11b on the n-th row are selected. Then, at time t19, the control signal pRES(n) transitions to a low level, and the reset transistor M6 is turned off.

Since the potential of the floating diffusion region FD slightly changes in response to such an operation, the output signals PixOut(m−1) and PixOut(m) also slightly change. Since the amount of this potential change varies every time a reset operation is performed, this may cause noise. Accordingly, in the period between the time t19 and time t20, the readout circuit 30 reads out the output signals PixOut(m−1) and PixOut(m) as noise signals. By performing correlated double sampling to acquire a difference between a light signal based on an incident light and a noise signal, it is possible to remove noise due to variation of a reset level.

At the time t20, the control signals pTX1A(n) and pTX2A(n) transition to the high level, and the transfer transistors M1A and M2A are turned on. Then, at time t21, the control signals pTX1A(n) and pTX2A(n) transition to the low level, and the transfer transistors M1A and M2A are turned off. This operation causes charges accumulated in the photoelectric conversion unit PDA of the pixel 11a to be transferred to the floating diffusion region FD of the pixel 11a. Further, charges accumulated in the photoelectric conversion unit PDA of the pixel 11b are transferred to the floating diffusion region FD of the pixel 11b. Here, an accumulation period of charges in the photoelectric conversion unit PDA of the pixel 11a corresponds to the length of the period T1A between the time t12 and the time t20. Further, an accumulation period of charges in the photoelectric conversion unit PDA of the pixel 11b corresponds to the length of the period T2A between the time t16 and the time t20.

In response to such transfer of charges, the potentials of the floating diffusion regions FD of the pixel 11a and the pixel 11b change, and the output signals PixOut(m−1) and PixOut(m) change. In the period between the time t21 and time t22, the readout circuit 30 reads out the output signals PixOut(m−1) and PixOut(m) as a light signal (an A-signal or a first signal) that is based on an incident light. Since transfer operations of charges from the pixels 11a and 11b arranged on the same row are performed simultaneously, the readout circuit 30 may simultaneously read out signals on a plurality of columns in accordance with control signals from TG 50.

Thereby, an A-signal based on charges generated in the period T1A in the photoelectric conversion unit PDA of the pixel 11a and an A-signal based on charges generated in the period T2A in the photoelectric conversion unit PDA of the pixel 11b are acquired.

At the time t22, the control signals pTX1B(n) and pTX2B(n) transition to the high level, and the transfer transistors M1B and M2B are turned on. Then, at time t23, the control signals pTX1B(n) and pTX2B(n) transition to the low level, and the transfer transistors M1B and M2B are turned off. By this operation, charges accumulated in the photoelectric conversion unit PDB of the pixel 11a are transferred to the floating diffusion region FD of the pixel 11a. Further, charges accumulated in the photoelectric conversion unit PDB of the pixel 11b are transferred to the floating diffusion region FD of the pixel 11b. Here, an accumulation period of charges in the photoelectric conversion unit PDB of the pixel 11a corresponds to the length of the period T1B between the time t14 and the time t22. Further, an accumulation period of charges in the photoelectric conversion unit PDB of the pixel 11b corresponds to the length of the period T2B between the time t18 and the time t22.

In response to such transfer of charges, the potentials of floating diffusion regions FD of the pixel 11a and the pixel 11b change, and the output signals PixOut(m−1) and PixOut(m) change. In the period between the time t23 and time t24, the readout circuit 30 reads out the output signals PixOut(m−1) and PixOut(m) as a light signal (an (A+B)-signal or a second signal) that is based on an incident light. Also in this process, since transfer operations of charges from the pixels 11a and 11b arranged on the same row are performed simultaneously, the readout circuit 30 may simultaneously read out signals on a plurality of columns in accordance with control signals from TG 50. Note that the read out light signal is a signal corresponding to the sum of charges accumulated in the photoelectric conversion unit PDA and charges accumulated in the photoelectric conversion unit PDB.

Thereby, an (A+B)-signal based on both charges generated in the period T1A in the photoelectric conversion unit PDA of the pixel 11a and charges generated in the period T1B in the photoelectric conversion unit PDB of the pixel 11a is acquired. Further, an (A+B)-signal based on both charges generated in the period T2A in the photoelectric conversion unit PDA of the pixel 11b and charges generated in the period T2B in the photoelectric conversion unit PDB of the pixel 11b is acquired.

At time t24, the control signal pRES(n) transitions to the high level, and the reset transistor M6 is turned on. Thereby, the floating diffusion region FD returns to a reset state, and the process of readout from the pixels 11a and 11b on the n-th row ends.

A difference between the (A+B)-signal and the A-signal is acquired by a signal processing circuit or the like outside the imaging device 100, and thereby a B-signal is acquired. The A-signal and the B-signal are signals based on charges generated by lights that have passed through different pupil regions in the imaging optical system (that is, pupil-divided lights), and thus are focus detection signals that may be used for phase difference focus detection. Further, the (A+B)-signal is an imaging signal used for generation of an image. In such a way, the imaging device 100 of the present embodiment can acquire focus detection signals and an imaging signal in parallel within one frame period.

Further, in the imaging device 100 of the present embodiment, an accumulation time for charges in the pixel 11a (the length of the periods T1A and T1B) is longer than an accumulation time for charges in the pixel 11b (the length of the periods T2A and T2B). Thereby, the focus detection signal and the imaging signal can be generated by two types of accumulation times, respectively. While there is constraint due to a saturation charge amount or the like in a dynamic range in focus detection and capturing, the dynamic range can be expanded by performing a process of acquiring signals by using two types of accumulation time and appropriately using these signals in accordance with illuminance.

As described above, according to the present embodiment, signals caused by different accumulation times are output from the pixel 11a and the pixel 11b, and thereby focus detection signals and an imaging signal that are suitable for expansion of the dynamic range can be acquired. Therefore, the imaging device 100 that can realize higher functionality is provided.

In FIG. 2, the pixels 11a and the pixels 11b are arranged alternately on the same row. Further, the pixels 11a and the pixels 11b are arranged alternately also on the same column. Such arrangement allows the pixels 11a and the pixels 11b to be arranged at an even density on the same row or on the same column within the pixel array 10. However, the arrangement scheme of the pixels 11a and the pixels 11b are not limited to that illustrated in FIG. 2 and may be a pattern in which the pixels 11a and the pixels 11b occur alternately on every two rows or every two columns, for example.

Further, a reset operation may be performed between readout of an A-signal and readout of a B-signal as a modified example of the readout method described above. According to such driving, the A-signal and the B-signal can be obtained separately. The sum of the A-signal and the B-signal is then acquired by using a signal processing circuit or the like outside the imaging device 100, and thereby an (A+B)-signal is acquired.

Second Embodiment

Figure 4B:
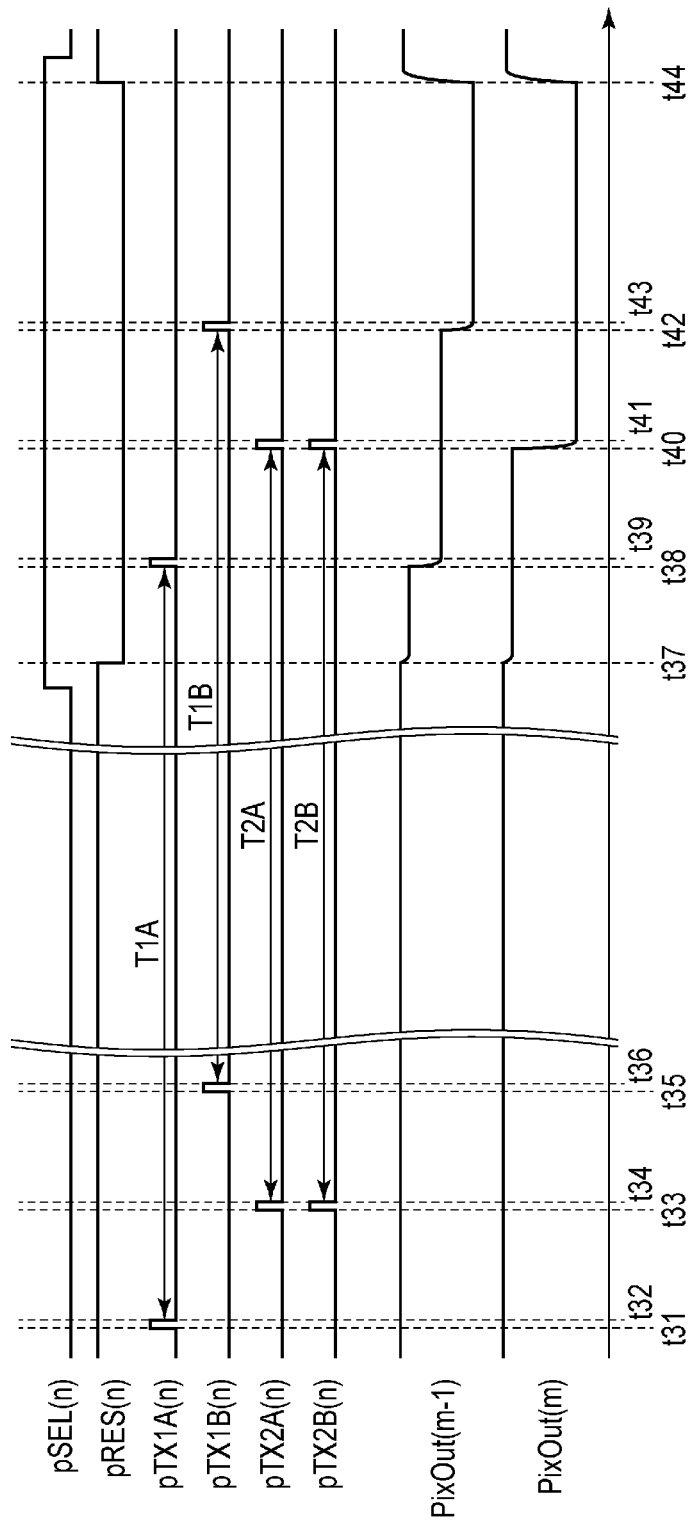

With reference to FIG. 4B, a second embodiment of the present invention will be described. The second embodiment is different from the first embodiment in the timing when respective control signals are supplied. Since features other than the supply timings of respective control signals, such as the circuit configuration of the pixels 11a and 11b, the blocks of the imaging device 100, or the like, are the same as those in the first embodiment, the description thereof will be omitted. FIG. 4B is a timing diagram illustrating a drive method of the imaging device 100 according to the present embodiment. With reference to FIG. 4B, the operation of the imaging device 100 will be described.

Since the operation before time t33 is the same as the operation before the time t13 in the first embodiment, the description thereof will be omitted. At the time t33, the control signals pTX2A(n) and the pTX2B(n) transition to the high level, and the transfer transistors M2A and M2B are turned on. Then, at time t34, the control signals pTX2A(n) and the pTX2B(n) transition to the low level, and the transfer transistors M2A and M2B are turned off. This operation resets the photoelectric conversion units PDA and PDB of the pixel 11b simultaneously. The photoelectric conversion units PDA and PDB of the pixel 11b then start accumulating charges based on an incident light from time t34.

Since the operations at time t35 and t36 are the same as those at the time t13 and t14 in the first embodiment, the description thereof will be omitted. Further, since driving of the control signals pSEL(n) and pRES(n) and readout of a noise signal around time t37 are the same as those around the time t19 in the first embodiment, the description thereof will be omitted.

At time t38, the control signal pTX1A(n) transitions to the high level, and the transfer transistor M1A is turned on. Then, at time t39, the control signal pTX1A(n) transitions to the low level, and the transfer transistor M1A is turned off. This operation causes charges accumulated in the photoelectric conversion unit PDA of the pixel 11a to be transferred to the floating diffusion region FD of the pixel 11a. Here, an accumulation period of charges in the photoelectric conversion unit PDA of the pixel 11a corresponds to the length of the period T1A between the time t32 and the time t38.

In response to such transfer of charges, the potential of the floating diffusion region FD of the pixel 11a changes, and the output signal PixOut(m−1) also changes. In the period between the time t39 and time t40, the readout circuit 30 reads out the output signal PixOut(m−1) as a light signal (an A-signal) that is based on an incident light. Thereby, the A-signal based on charges generated in the period T1A in the photoelectric conversion unit PDA of the pixel 11a is acquired.

At the time t40, the control signals pTX2A(n) and pTX2B(n) transition to the high level, and the transfer transistors M2A and M2B are turned on. Then, at time t41, the control signals pTX2A(n) and pTX2B(n) transition to the low level, and the transfer transistors M2A and M2B are turned off. This operation causes charges accumulated in the photoelectric conversion units PDA and PDB of the pixel 11b to be transferred to the floating diffusion region FD of the pixel 11b. Here, accumulation periods of charges in the photoelectric conversion units PDA and PDB of the pixel 11b correspond to the lengths of the periods T2A and T2B between the time t34 and the time t40, respectively. In the present embodiment, since transfer operations by the transfer transistors M2A and M2B are performed simultaneously, the period T2A and the period T2B are the same.

In response to such transfer of charges, the potential of floating diffusion region FD of the pixel 11b changes, and the output signal PixOut(m) also changes. In the period between the time t41 and time t42, the readout circuit 30 reads out the output signal PixOut(m) as a light signal (an (A+B)-signal) that is based on an incident light. This light signal is a signal corresponding to the sum of charges accumulated in the photoelectric conversion unit PDA and charges accumulated in the photoelectric conversion unit PDB.

At time t42, the control signal pTX1B(n) transitions to the high level, and the transfer transistor M1B is turned on. Then, at time t43, the control signal pTX1B(n) transitions to the low level, and the transfer transistor M1B is turned off. This operation causes charges accumulated in the photoelectric conversion unit PDB of the pixel 11a to be transferred to the floating diffusion region FD of the pixel 11a. Here, an accumulation period of charges in the photoelectric conversion unit PDB of the pixel 11a corresponds to the length of the period T1B between the time t36 and the time t42.

In response to such transfer of charges, the potential of the floating diffusion region FD of the pixel 11a changes, and the output signal PixOut(m−1) also changes. In the period between the time t43 and time t44, the readout circuit 30 reads out the output signal PixOut(m−1) as a light signal (an (A+B)-signal) that is based on an incident light. This light signal is a signal corresponding to the sum of charges accumulated in the photoelectric conversion unit PDA and charges accumulated in the photoelectric conversion unit PDB. Since the operation at the time t44 is the same as the operation at the time t24 in the first embodiment, the description thereof will be omitted.

As described above, in the present embodiment, transfer of charges is controlled by using four types of control signals of pTX1A(n), pTX1B(n), pTX2A(n), and pTX2B(n) for the pixels 11a and 11b on the same row. With such control, the pixel 11a outputs the A-signal and the (A+B)-signal individually, and the pixel 11b outputs only the (A+B)-signal. With respect to a signal output from the pixel 11a, it is possible to acquire the B-signal by acquiring the difference between the (A+B)-signal and the A-signal by using a signal processing circuit or the like outside the imaging device 100. In the same manner as the case of the first embodiment, the A-signal and the B-signal are used as focus detection signals, and the (A+B)-signal is used as an imaging signal. Therefore, the imaging device 100 of the present embodiment also can acquire focus detection signals and an imaging signal in parallel within one frame period in the same manner as the case of the first embodiment.

Further, since the imaging device 100 of the present embodiment is configured such that the pixel 11b outputs only the (A+B)-signal, the number of times of readout operations can be reduced. Thereby, advantages of reduction in signal processing time and reduction in power consumption caused by signal processing can be obtained.

Although the number of pixels which can output focus detection signals is reduced in the present embodiment, the advantages of reduction in signal processing time and reduction in power consumption can be obtained, and therefore the present embodiment is preferable for a case where accuracy of focus detection is less required.

Note that, in FIG. 4B, the time t34 is set to the time between the time t32 and the time t36, and the time t41 is set to the time between the time t39 and the time t43. This can reduce an influence of a difference in the accumulation period (difference in capturing time) of the pixel 11a and the pixel 11b on image quality. However, this configuration is not essential, the time t34 may be the same as the time t32 or the time t36, or the time t41 may be the same as the time t39 or the time t43, for example. Further, as with the first embodiment, the length of an accumulation period of the pixel 11a and the length of an accumulation period of the pixel 11b may be different from each other. In such a case, the advantage of expansion of the dynamic range is obtained in the same manner as the first embodiment.

Third Embodiment

Figure 5:
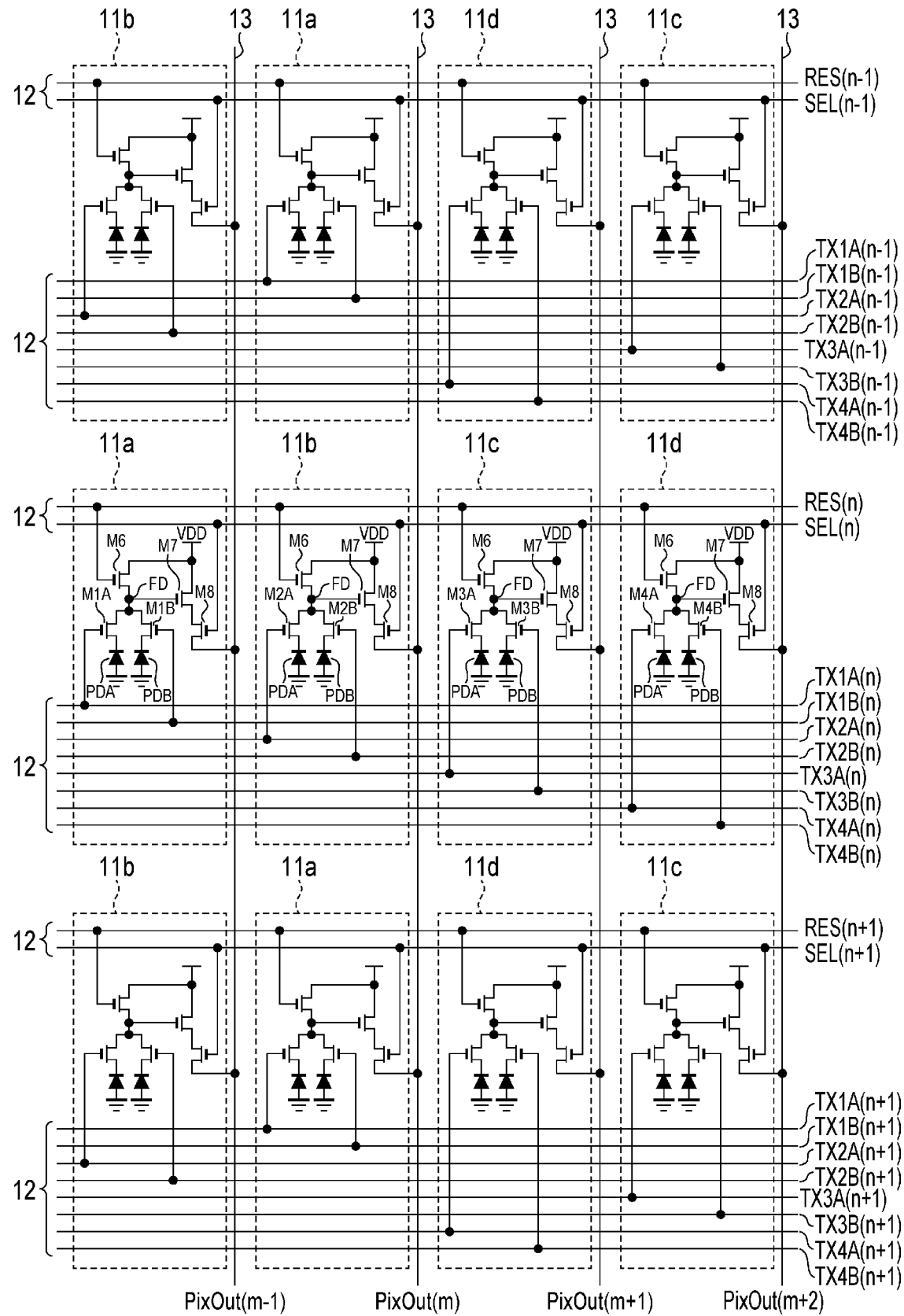
FIG. 5 is a circuit diagram illustrating a configuration of a pixel array according to a third embodiment of the present invention.

With reference to FIG. 5, a third embodiment of the present invention will be described. The third embodiment is different from the first or second embodiment in the configuration of control signal lines. Since other features are the same as those in the first or second embodiment, the description thereof will be omitted. FIG. 5 is a circuit diagram illustrating a configuration of the pixel array 10 according to the present embodiment.

In the present embodiment, the control signal line group 12 further includes control signal lines TX3A, TX3B, TX4A, and TX4B in addition to those described in the first embodiment. Further, on the n-th row of the pixel array 10, pixels 11c are arranged on the (m+1)th column, and pixels 11d are arranged on the (m+2)th column. The pixel 11c has a transfer transistor M3A supplied with a control signal from the control signal line TX3A and a transfer transistor M3B supplied with a control signal from the control signal line TX3B. The pixel 11d has a transfer transistor M4A supplied with a control signal from the control signal line TX4A and a transfer transistor M4B supplied with a control signal from the control signal line TX4B.

In such a way, in the present embodiment, eight control signal lines for transfer transistors are provided on each single row that are twice the control signal lines in the first embodiment or the second embodiment. Thereby, control of the transfer transistors M1A, M1B, M2A, M2B, M3A, M3B, M4A, and M4B can be performed at different timings for four pixels 11a, 11b, 11c, and 11d arranged on the same row.

Figure 6:
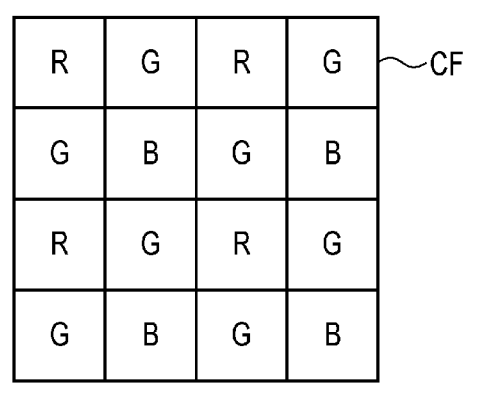

The configuration of the present embodiment is preferably used in arrangement in which a plurality of color filters CF of different colors is provided on the same row. An example of the arrangement of such color filters CF will be described. FIG. 6 is an arrangement diagram of the color filters CF according to the present embodiment and schematically illustrates the arrangement of colors of the color filters CF inside the pixel array 10. The symbol "R" in FIG. 6 indicates a pixel (R-pixel) in which the color filter CF having a spectral characteristic that mainly transmits a red light is arranged. The symbol "G" in FIG. 6 indicates a pixel (G-pixel) in which the color filter CF having a spectral characteristic that mainly transmits a green light is arranged. The symbol "B" in FIG. 6 indicates a pixel (B-pixel) in which the color filter CF having a spectral characteristic that mainly transmits a blue light is arranged. This enables capturing of a color image with each color of red, green, and blue. While the arrangement illustrated in FIG. 6 is arrangement called the Bayer arrangement, this is an example, and other patterns of the arrangement may be employed. Further, arrangement using color filters of a color other than the above, such as a complementary-color filter, may be employed.

In the imaging device 100 having the color filters CF with the Bayer arrangement as illustrated in FIG. 6, pixels of two colors are present within a single row. In the configuration in the first embodiment or the second embodiment, since four control signal lines for transfer transistors are provided for each row, it is not possible to perform driving as illustrated in FIG. 4A or FIG. 4B at different timings for respective colors. On the other hand, in the present embodiment, since eight control signal lines for transfer transistors are provided on each row that are twice the control signal lines in the first embodiment or the second embodiment, it is possible to perform the drive method of the first embodiment or the second embodiment at different timings for respective colors of pixels.

As described above, according to the present embodiment, in addition that the same driving as that in the first embodiment or the second embodiment can be performed to obtain the same advantage, since transfer transistors can be driven at different timings for respective colors of pixels, the flexibility of the drive method is improved. Therefore, the imaging device 100 that may realize higher functionality is provided.

Note that, while the number of control signal lines for transfer transistors is greater than that of the first embodiment or the second embodiment in order to perform transferring at different timings for respective colors of pixels in the example described above, the added control signal lines may be used for other purposes. For example, the number of types of accumulation time may be increased from two to four by modifying the drive method of FIG. 4A, and four types of imaging signals and focus detection signals having different accumulation times may be output. Thereby, an expansion process of the dynamic range can be effectively performed. For example, when a process for synthesizing images in order to generate an image with an expanded dynamic range is performed, unnaturalness of a synthesized image due to a difference in accumulation times is reduced when the number of images having different types of accumulation times is larger.

Fourth Embodiment

Figure 7:
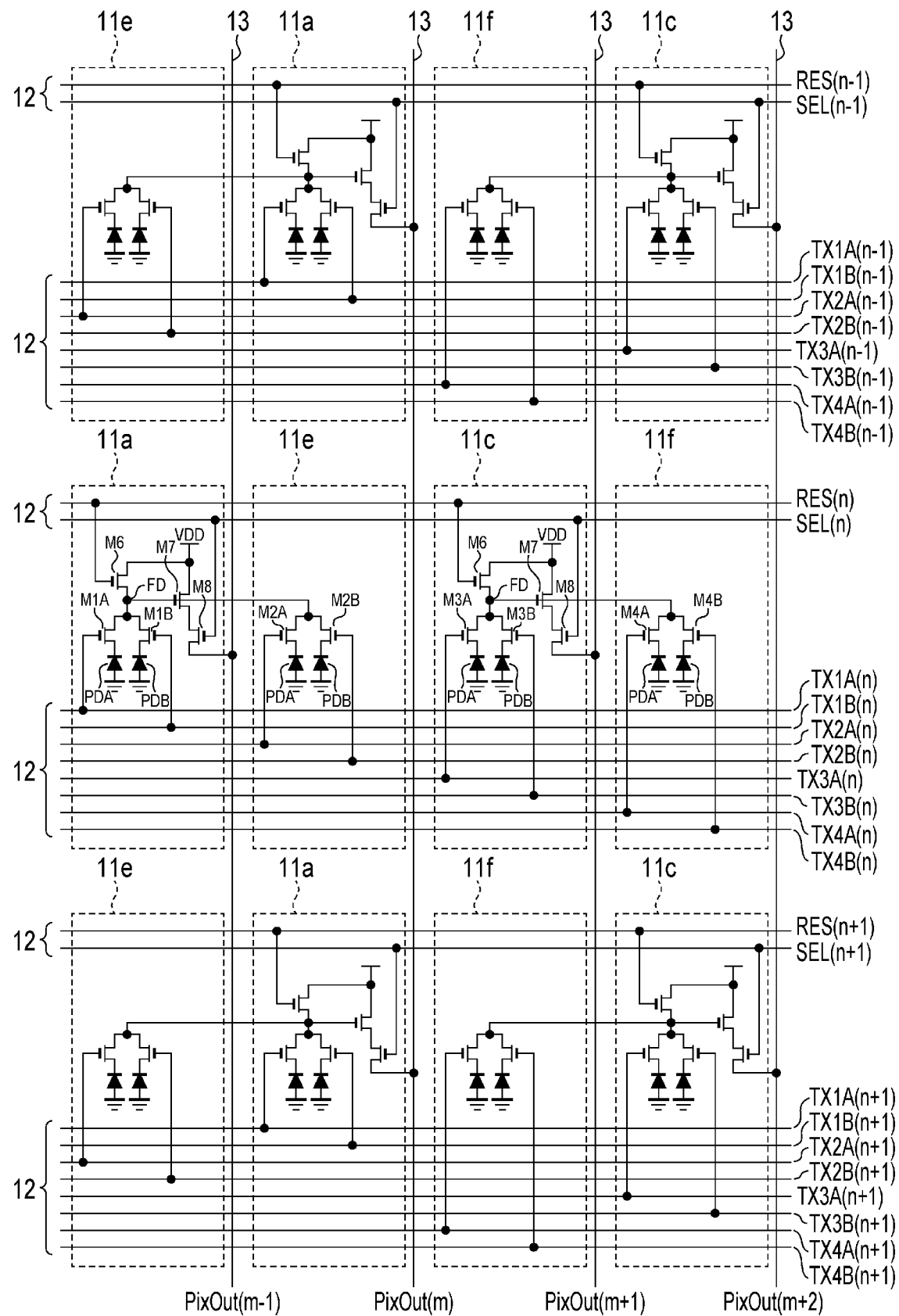
FIG. 7 is a circuit diagram illustrating a configuration of a pixel array according to a fourth embodiment of the present invention.

With reference to FIG. 7, a fourth embodiment of the present invention will be described. The fourth embodiment is different from the third embodiment in that two pixels share the floating diffusion region FD. Since other features are the same as those in the third embodiment, the description thereof will be omitted. FIG. 7 is a circuit diagram illustrating a configuration of the pixel array 10 according to the present embodiment.

In FIG. 7, when the pixels 11a and 11e on the n-th row are focused on, the drains of the transfer transistors M2A and M2B of the pixel 11e are connected to the floating diffusion region FD of the pixel 11a adjacent to the pixel 11e. Further, when the pixels 11c and 11f on the n-th row are focused on, the drains of the transfer transistors M4A and M4B of the pixel 11f are connected to the floating diffusion region FD of the pixel 11c adjacent to the pixel 11f. Further, in the pixels 11e and 11f, the reset transistor M6, the amplification transistor M7, the select transistor M8, or the like are omitted.

In the configuration of the present embodiment, the same driving as the first to third embodiments is possible, and the number of circuit components such as transistors provided within the pixels 11e and 11f can be reduced. Thereby, the exclusive area of circuit components can be reduced. Further, by allocating the area obtained by the eliminated circuit components to the area for the photoelectric conversion units PDA and PDB or the like, it is possible to increase the saturation charge amount and improve the image quality of an image captured by the imaging device 100. Therefore, the imaging device 100 that may realize higher functionality is provided.

Note that the exclusive area of the eliminated circuit components may be allocated for other purposes. For example, an element used for increasing the capacitance of the floating diffusion region FD such as a capacitance addition transistor, a capacitor, or the like described in a sixth embodiment below may be added.

Further, while the floating diffusion region FD is shared by two pixels aligned in the horizontal direction in FIG. 7, the embodiment is not limited thereto. For example, the floating diffusion region FD may be shared by two pixels aligned in the vertical direction, or the floating diffusion region FD may be shared by four pixels of two pixels in the vertical direction and two pixels in the horizontal direction.

Fifth Embodiment

Figure 8:
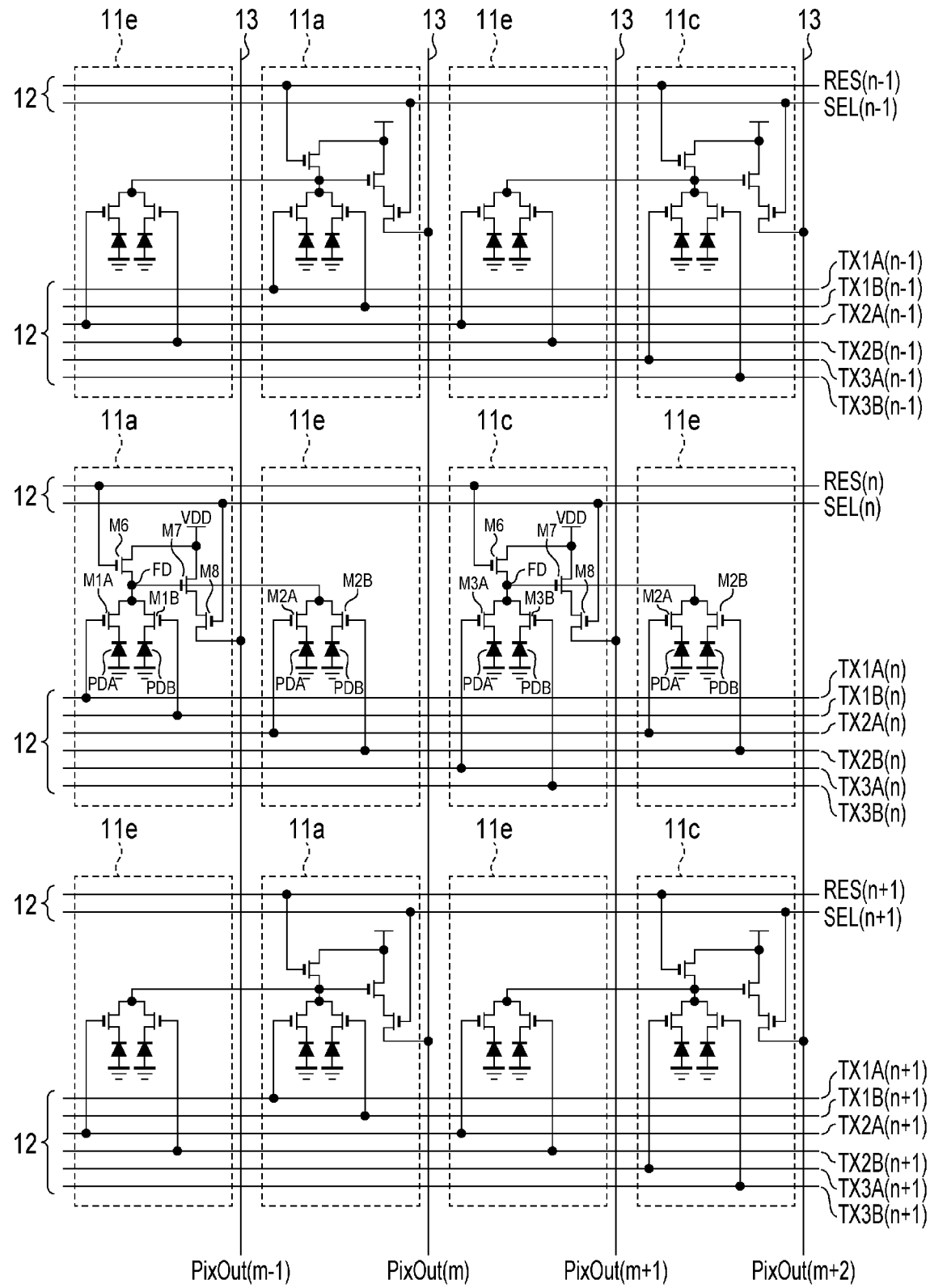
FIG. 8 is a circuit diagram illustrating a configuration of a pixel array according to a fifth embodiment of the present invention.

With reference to FIG. 8, a fifth embodiment of the present invention will be described. The fifth embodiment is different from the fourth embodiment in the configuration of control signal lines. Since other features are the same as those in the fourth embodiment, the description thereof will be omitted. FIG. 8 is a circuit diagram illustrating a configuration of the pixel array 10 according to the present embodiment.

In the present embodiment, the control signal lines TX4A and TX4B are omitted from the control signal line group 12 compared to that described in the fourth embodiment. Further, the pixel 11e is arranged on each of the m-th column and the (m+2)-th column on the n-th row of the pixel array 10. A control signal is supplied to the transfer transistor M2A of the pixel 11e from the common control signal line TX2A. Further, a control signal is supplied to the transfer transistor M2B of the pixel 11e from the common control signal line TX2B. In such a way, in the present embodiment, a common control signal is supplied to the two transfer transistors out of four pixels included on the same row.

Also in the present embodiment, an advantage of improvement of flexibility of the drive method can be obtained in a similar manner to the third and fourth embodiments, for example. The advantage of improvement of flexibility is reduced because the number of control signal lines for transfer transistors is less than that in the third embodiment and the fourth embodiment, however, the number of control signal lines can be reduced compared to the third embodiment and the fourth embodiment. Therefore, the imaging device 100 that may realize higher functionality is provided.

In the configuration of the present embodiment, it is possible to allocate control signal lines for different transfer transistors to the R-pixels on the same row in the Bayer arrangement. In such a case, by applying the drive method of the second embodiment, it is possible to perform such driving that causes some of R-pixels on the same row to output focus detection signals and imaging signals and causes another some of R-pixels on the same row to output only imaging signals. Note that R-pixels in this example may be replaced with G-pixels or B-pixels.

Sixth Embodiment

Figure 9:
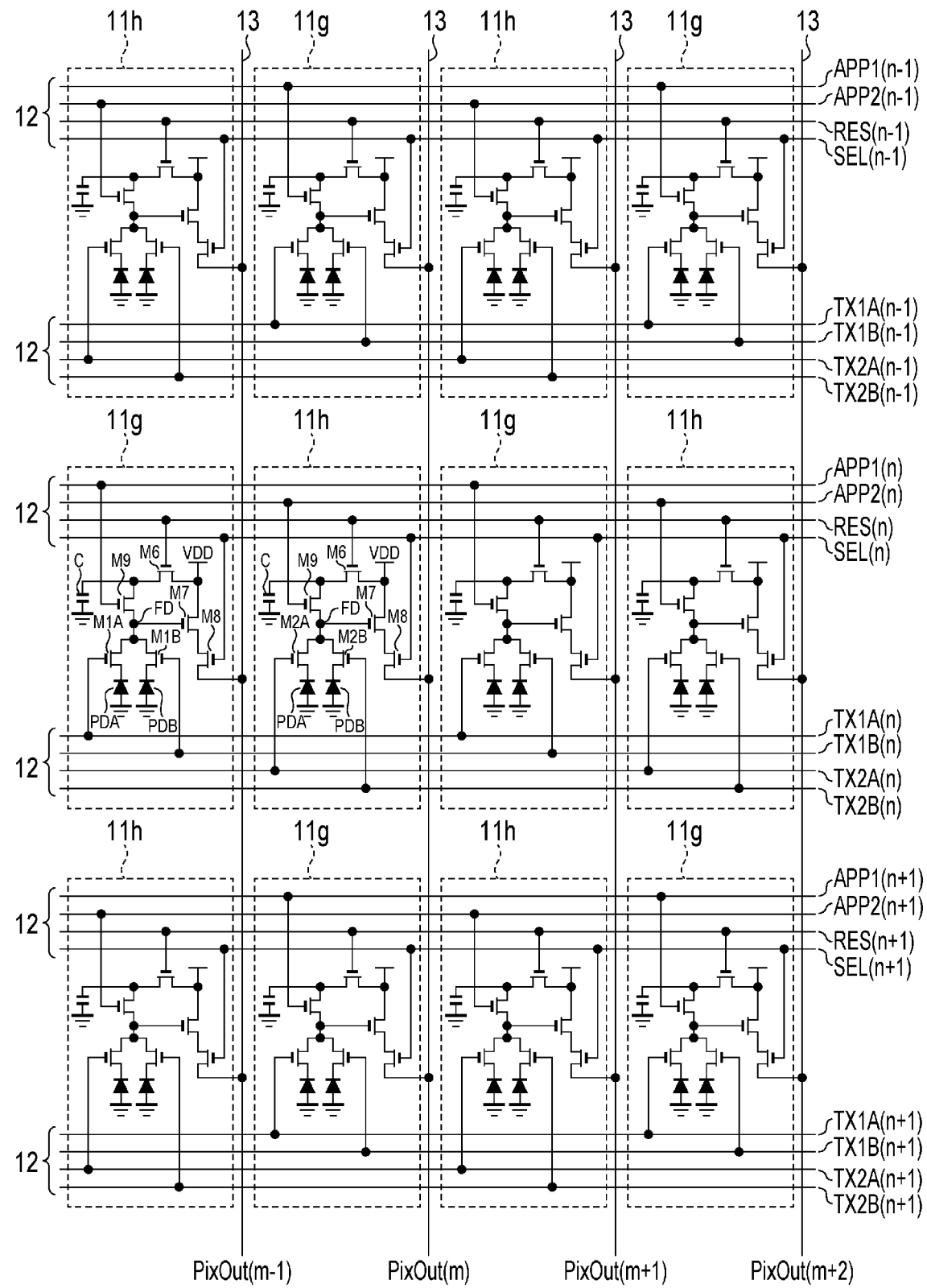
FIG. 9 is a circuit diagram illustrating a configuration of a pixel array according to a sixth embodiment of the present invention.
Figure 10B:
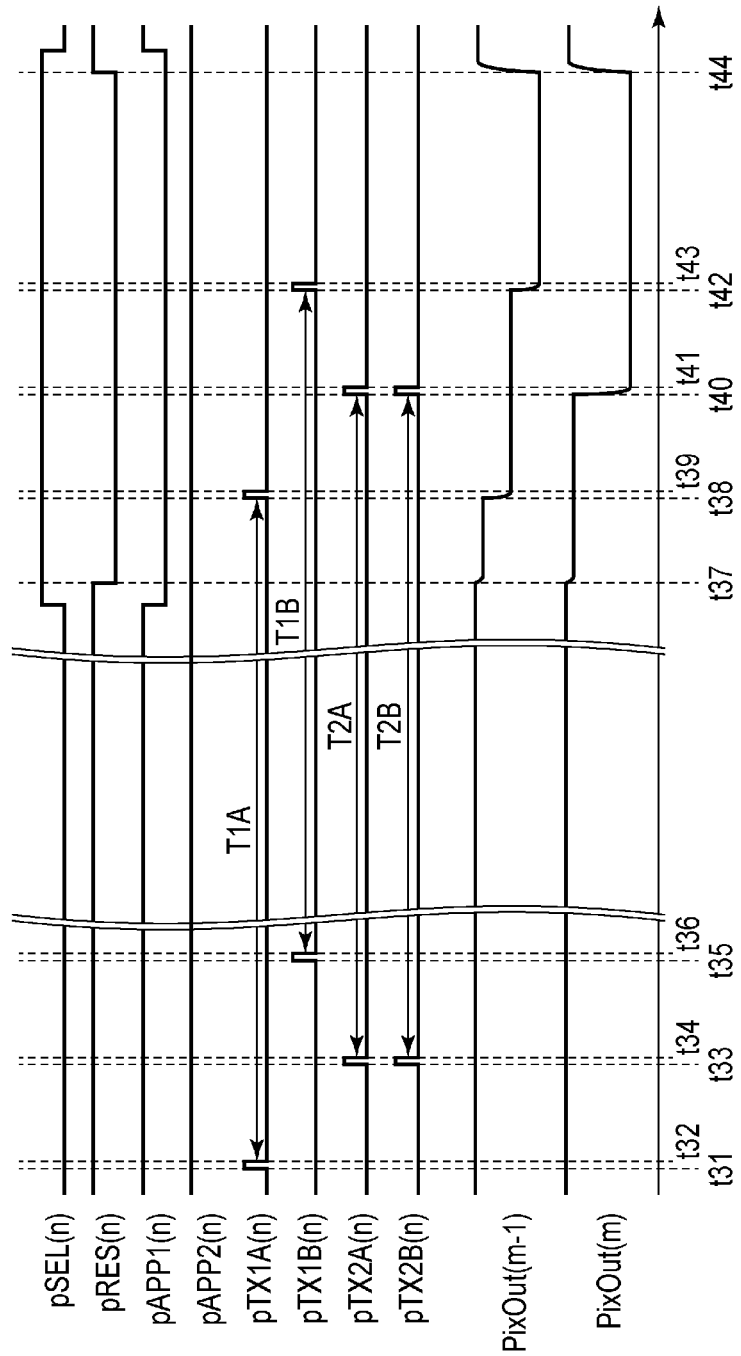

With reference to FIG. 9, FIG. 10A, and FIG. 10B, a sixth embodiment of the present invention will be described. The sixth embodiment is different from the first and second embodiments in that a capacitance addition transistor M9 (a capacitance control unit) and a capacitor C are provided in each of pixels 11h and 11g. Since other features are the same as those in the first and second embodiments, the description thereof will be omitted. FIG. 9 is a circuit diagram illustrating a configuration of the pixel array 10 according to the present embodiment.

In each of the pixels 11h and 11g, the capacitance addition transistor M9 and the capacitor C are provided to the node between the floating diffusion region FD and the reset transistor M6. The source of the capacitance addition transistor M9 is connected to the floating diffusion region FD, the drain is connected to one end of the capacitance C and the source of the reset transistor M6. The other end of the capacitor C is connected to the ground voltage line.

The control signal line group 12 on each row further includes a control signal line APP1 (a first control signal line) and a control signal line APP2 (a second control signal line). The control signal line APP1 is connected to the gates of the capacitance addition transistors M9 of the pixels 11g aligned on the same row, respectively, and forms a signal line common to these pixels 11g. The control signal line APP2 is connected to the gates of the capacitance addition transistors M9 of the pixels 11h aligned on the same row, respectively, and forms a signal line common to these pixels 11h.

The control signal lines APP1 and APP2 are connected to the vertical scanning circuit 20. Control signal pAPP1 and pAPP2 used for controlling the capacitance addition transistors M9 are output from the vertical scanning circuit 20 to the control signal lines APP1 and APP2, respectively.

With reference to FIG. 10A and FIG. 10B, the operation of the capacitance addition transistor M9 will be described.

FIG. 10A is a timing diagram illustrating an operation corresponding to FIG. 4A in the first embodiment, and FIG. 10B is a timing diagram illustrating an operation corresponding to FIG. 4B in the second embodiment. Since other control signals than the control signals pAPP1 and pAPP2 are the same as those in the first embodiment or the second embodiment, the duplicated description will be omitted.

In the period on and before time t18 in FIG. 10A, the control signals pRES(n), pAPP1(n), and pAPP2(n) are all at the high level, and the reset transistors M6 and the capacitance addition transistors M9 of the pixels 11h and 11g are in an on-state. Thereby, the period on and before the time t18, the floating diffusion region FD and the capacitor C have been reset.

In the period on and after time t19 in FIG. 10A, the control signals pRES(n) and pAPP2(n) are at the low level and the control signal pAPP1(n) is at the high level. Thus, the reset transistors M6 of the pixels 11h and 11g are in an off-state, the capacitance addition transistor M9 of the pixel 11g is in an on-state, and the capacitance addition transistor M9 of the pixel 11h is in an off-state. Therefore, in the period on and after the time t19, while the capacitor C is connected to the floating diffusion region FD of the pixel 11g, the capacitor C is not connected to the floating diffusion region FD of the pixel 11h. That is, while the capacitance value of the floating diffusion region FD of the pixel 11g is increased, the capacitance value of the floating diffusion region FD of the pixel 11h is not increased.

As discussed above, in the drive method of FIG. 10A the present embodiment, such driving is realized that changes whether or not to increase the capacitance value of the floating diffusion region FD in addition to changing the accumulation time for each pixel on the same column in the same manner as the first embodiment. Thereby, it is possible to more effectively realize expansion of the dynamic range. Note that, in the drive method of this example, the capacitance addition transistor M9 of the pixel 11g may be turned off and the capacitance addition transistor M9 of the pixel 11h may be turned on in the period on and after the time t19 in contrast to the method of FIG. 10A.

FIG. 10B illustrates a drive method in which driving by the same control signals pRES(n), pAPP1(n), and pAPP2(n) as those in FIG. 10A is combined with the drive method of the second embodiment. In such a configuration, for example, since a saturation charge amount can be increased by an increase of the capacitance value of the floating diffusion region FD, this provides an advantage that saturation of a signal when performing capturing or focus detection on a high-illuminance subject is less likely to occur. Therefore, according to the present embodiment, the imaging device 100 that may realize higher functionality is provided.

In a drive method in FIG. 10A and FIG. 10B, the level of the control signals pAPP1(n) and pAPP2(n) is basically at the high level and is changed to the low level where necessary. As another drive method, however, the level of the control signals pAPP1(n) and pAPP2(n) may be basically at the low level and may be changed to the high level where necessary.

Further, in the present embodiment, the accumulation times may be the same for the pixel 11g and the pixel 11h. On the other hand, such control is employed that turns on the capacitance addition transistor M9 of the pixel 11g and turns off the capacitance addition transistor M9 of the pixel 11h. With such control, it is possible to obtain focus detection signals or an imaging signal having different gain in accordance with color without changing the accumulation time.

Seventh Embodiment

Figure 11:
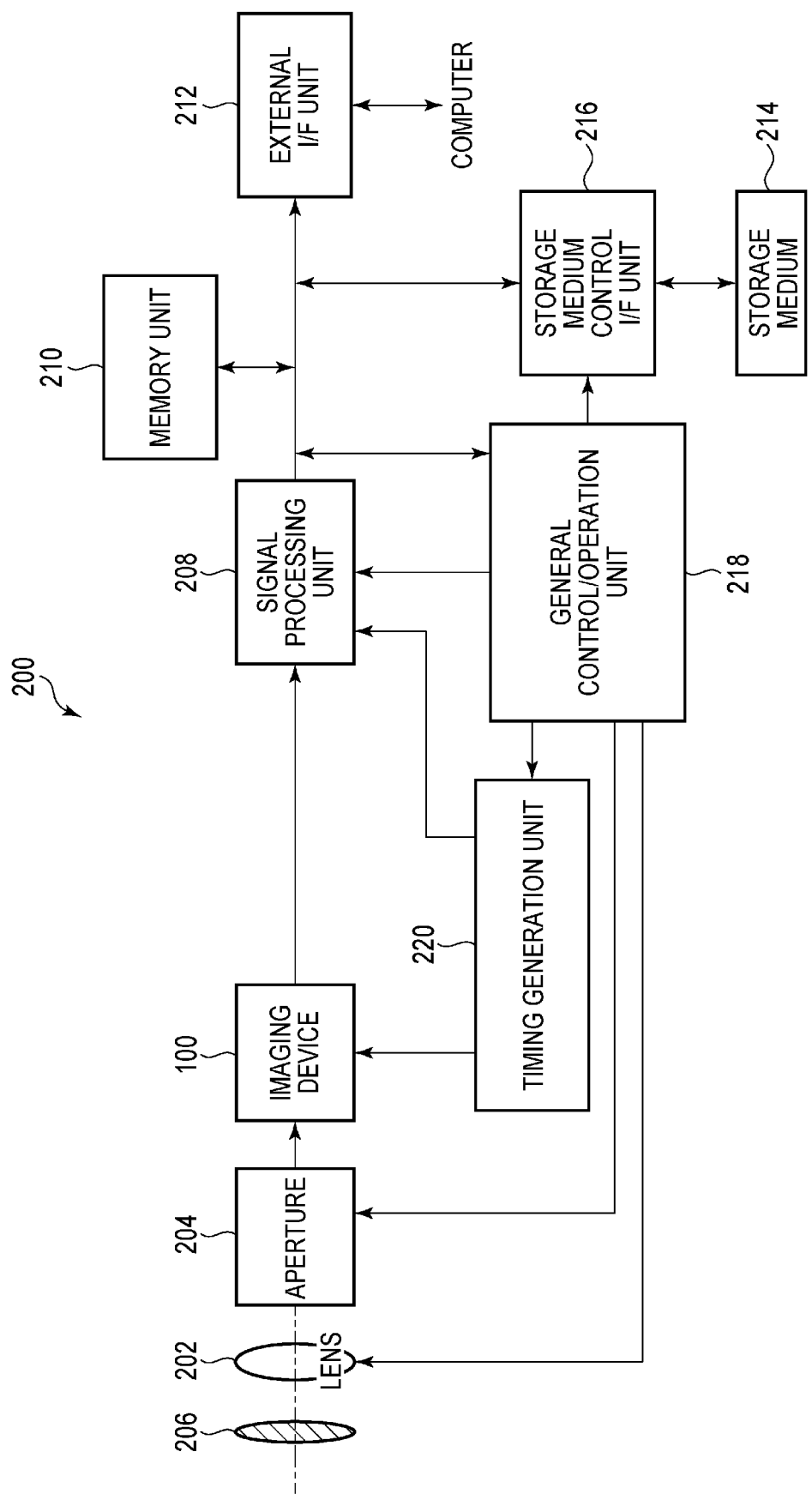
FIG. 11 is a block diagram illustrating a general configuration of an imaging system according to a seventh embodiment of the present invention.

An imaging system according to a seventh embodiment of the present invention will be described by using FIG. 11. The same components as those of the imaging device 100 according to the first to sixth embodiments are labeled with the same reference, and the description thereof will be omitted or simplified. FIG. 11 is a block diagram illustrating a general configuration of the imaging system according to the present embodiment.

The imaging device 100 described in the above first to sixth embodiments is applicable to various imaging systems. Examples of applicable imaging systems may include a digital still camera, a digital camcorder, a surveillance camera, a copying machine, a fax machine, a mobile phone, an on-vehicle camera, an observation satellite, and the like. In addition, a camera module including an optical system such as a lens and an imaging device is also included in the imaging system. FIG. 11 illustrates a block diagram of a digital still camera as an example out of these examples.

The imaging system 200 illustrated as an example in FIG. 11 has an imaging device 100, a lens 202 that captures an optical image of a subject onto the imaging device 100, an aperture 204 for changing a light amount passing through the lens 202, and a barrier 206 for protecting the lens 202. The lens 202 and the aperture 204 form an optical system that converges a light onto the imaging device 100. The imaging device 100 is the imaging device 100 described in any of the first to sixth embodiments and converts an optical image captured by the lens 202 into image data.

The imaging system 200 further has a signal processing unit 208 that processes an output signal output from the imaging device 100. The signal processing unit 208 performs various correction and compression, if necessary, and outputting image data. The signal processing unit 208 may be formed on a semiconductor substrate on which the imaging device 100 is provided or may be formed on a separate semiconductor substrate from the imaging device 100.

The imaging system 200 further has a memory unit 210 for temporarily storing image data therein and an external interface unit (external I/F unit) 212 for communicating with an external computer or the like. The imaging system 200 further has a storage medium 214 such as a semiconductor memory for performing storage or readout of imaging data and a storage medium control interface unit (storage medium control I/F unit) 216 for performing storage or readout on the storage medium 214. Note that the storage medium 214 may be embedded in the imaging system 200 or may be removable.

The imaging system 200 further has a general control/operation unit 218 that controls various operations and the entire digital still camera and a timing generation unit 220 that outputs various timing signals to the imaging device 100 and the signal processing unit 208. Here, the timing signal or the like may be input from the outside, and the imaging system 200 may have at least the imaging device 100 and the signal processing unit 208 that processes an output signal output from the imaging device 100.

The imaging device 100 outputs an imaging signal to the signal processing unit 208. The signal processing unit 208 performs predetermined signal processing on an imaging signal output from the imaging device 100 and outputs image data. The signal processing unit 208 uses an imaging signal to generate an image. The signal processing unit 208 may further perform signal processing on a focus detection signal.

By applying any of the imaging device 100 according to the first to sixth embodiments, it is possible to realize the imaging system 200 that may acquire a high quality image.

Eighth Embodiment

Figure 12A:
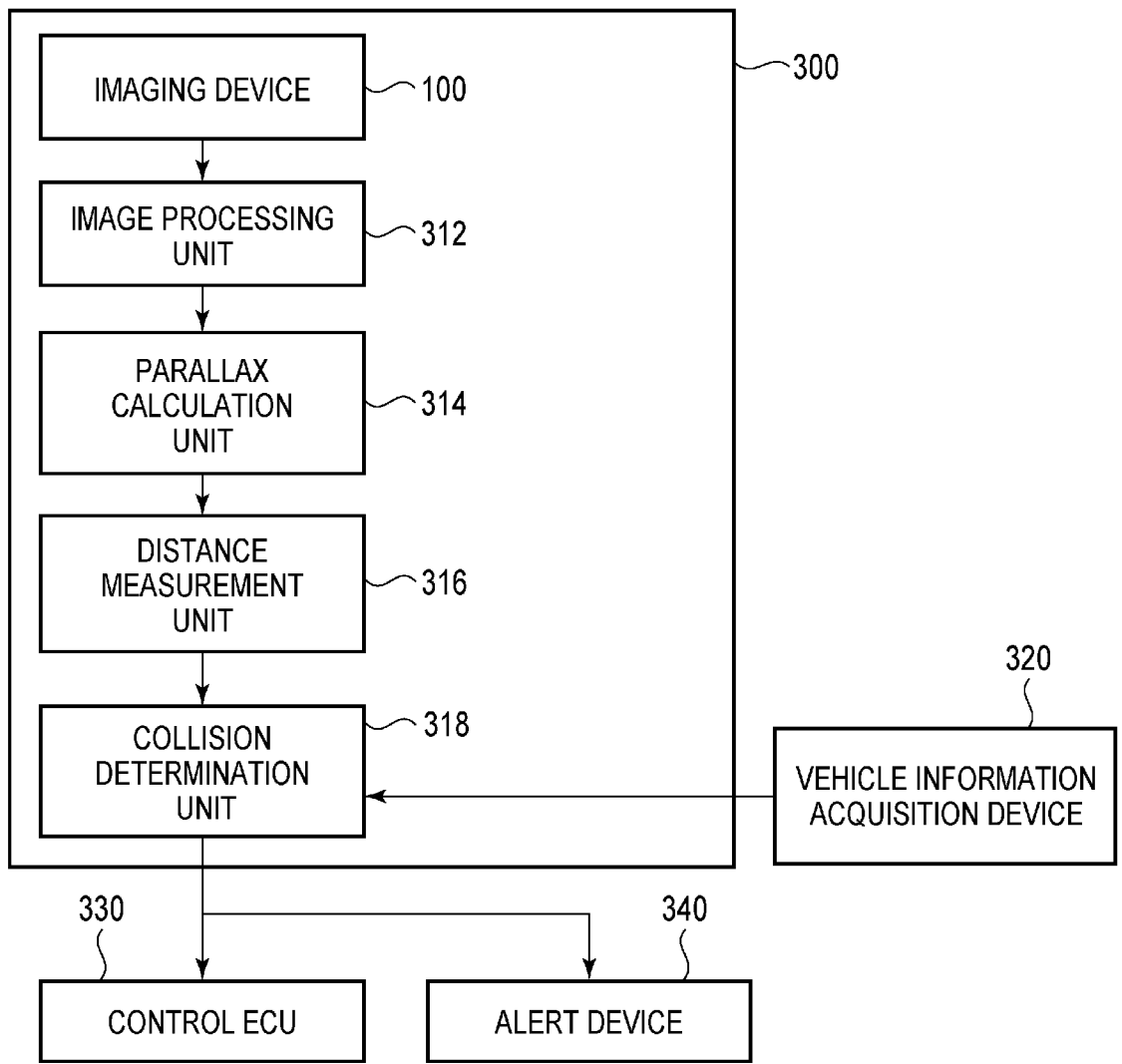
FIG. 12A and FIG. 12B are diagrams illustrating a configuration example of an imaging system and a mobile apparatus according to an eighth embodiment of the present invention.
Figure 12B:
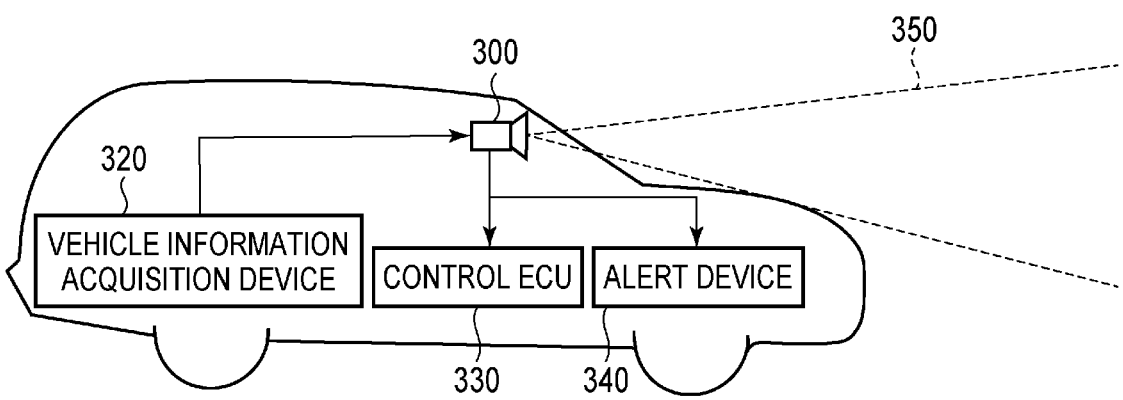

An imaging system and a mobile apparatus according to an eighth embodiment of the present invention will be described by using FIG. 12A and FIG. 12B. FIG. 12A and FIG. 12B are diagrams illustrating configurations of an imaging system 300 and a mobile apparatus according to the present embodiment.

FIG. 12A illustrates an example of an imaging system 300 related to an on-vehicle camera. The imaging system 300 has an imaging device 100. The imaging device 100 of the present embodiment is the imaging device 100 described in any of the above first to sixth embodiments. The imaging system 300 has an image processing unit 312 that performs image processing on a plurality of image data acquired by the imaging device 100 and a parallax calculation unit 314 that calculates a parallax (a phase difference of parallax images) from the plurality of image data acquired by the imaging system 300. Further, the imaging system 300 has a distance measurement unit 316 that calculates a distance to the object based on the calculated parallax and a collision determination unit 318 that determines whether or not there is a collision possibility based on the calculated distance. Here, the parallax acquisition unit 314 and the distance acquisition unit 316 are an example of a distance information acquisition unit that acquires distance information on the distance to the object. That is, the distance information is information on a parallax, a defocus amount, a distance to an object, or the like. The collision determination unit 318 may use any of the distance information to determine the collision possibility. The distance information acquisition unit may be implemented by dedicatedly designed hardware or may be implemented by a software module. Further, the distance information acquisition unit may be implemented by a Field Programmable Gate Array (FPGA), an Application Specific Integrated Circuit (ASIC), or the like, or may be implemented by combination thereof.

The imaging system 300 is connected to the vehicle information acquisition device 320 and can acquire vehicle information such as a vehicle speed, a yaw rate, a steering angle, or the like. Further, the imaging system 300 is connected to a control ECU 330, which is a control device that outputs a control signal for causing a vehicle to generate braking force based on a determination result by the collision determination unit 318. Further, the imaging system 300 is also connected to an alert device 340 that issues an alert to the driver based on a determination result by the collision determination unit 318. For example, when the collision probability is high as the determination result of the collision determination unit 318, the control ECU 330 performs vehicle control to avoid a collision or reduce damage by applying a brake, pushing back an accelerator, suppressing engine power, or the like. The alert device 340 alerts a user by sounding an alert such as a sound, displaying alert information on a display of a car navigation system or the like, providing vibration to a seat belt or a steering wheel, or the like.

In the present embodiment, an area around a vehicle, for example, a front area or a rear area is captured by using the imaging system 300. FIG. 12B illustrates the imaging system when a front area of a vehicle (a capturing area 350) is captured. The vehicle information acquisition device 320 transmits an instruction to the imaging system 300 or the imaging device 100 so as to perform a predetermined operation. Such a configuration can further improve the ranging accuracy.

Although the example of control for avoiding a collision to another vehicle has been described, the embodiment is applicable to automatic driving control for following another vehicle, automatic driving control for not going out of a traffic lane, or the like. Furthermore, the imaging system is not limited to a vehicle such as the subject vehicle and can be applied to a mobile apparatus (moving apparatus) such as a ship, an airplane, or an industrial robot, for example. In addition, the imaging system can be widely applied to a device which utilizes object recognition, such as an intelligent transportation system (ITS), without being limited to mobile apparatuses.

Modified Embodiments

The present invention is not limited to the embodiments described above, and various modifications are possible. For example, an example in which a part of the configuration of any of the embodiments is added to another embodiment or an example in which a part of the configuration of any of the embodiments is replaced with a part of the configuration of another embodiment is one of the embodiments of the present invention.

Further, the device and the system illustrated in the seventh and eighth embodiments are configuration examples of devices and systems to which the imaging device 100 of the present invention may be applied, and a device and a system to which the imaging device 100 of the present invention can be applied is not limited to the configuration illustrated in FIG. 11, FIG. 12A, or FIG. 12B.

Further, in the imaging device 100 disclosed in the above embodiments, the signal processing circuit such as the DSP 60 that processes signals output from pixels may be formed on the same semiconductor substrate as a substrate on which the pixels are formed or may be formed on a separate semiconductor substrate. In other words, the imaging device 100 may be formed of a single semiconductor substrate or may be formed of a plurality of semiconductor substrates.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-113789, filed Jun. 14, 2018, which is hereby incorporated by reference herein in its entirety.

What is claimed is:

1. An imaging device comprising:
a plurality of pixels arranged to form a plurality of rows and a plurality of columns, each of the plurality of pixels including a first photoelectric conversion unit that one pupil-divided part of an incident light enters, a second photoelectric conversion unit that another pupil-divided part of the incident light enters, an amplification circuit having an input node and configured to output a signal based on charges transferred to the input node, and a capacitance control transistor configured to change a capacitance value of the input node in accordance with a control signal;
a control signal line group arranged corresponding to each row, the control signal line group including a first control signal line and a second control signal line; and
a readout circuit configured to read out signals output from the plurality of pixels, the readout circuit being provided for each column or each column group of the plurality of columns,
wherein each of the plurality of pixels is configured to output a first signal based on charges generated by the first photoelectric conversion unit and a second signal based on at least charges generated by the second photoelectric conversion unit in one frame period,
wherein the plurality of pixels includes a first pixel and a second pixel that are arranged on columns different from each other and arranged on a single row,
wherein an accumulation time in which charges are accumulated for obtaining one of the first signal and the second signal of the first pixel and an accumulation time in which charges are accumulated for obtaining corresponding one of the first signal and the second signal of the second pixel are different from each other in the one frame period,
wherein, in the one frame period, a capacitance value of the input node of the first pixel and a capacitance value of the input node of the second pixel are controlled to values different from each other,
wherein the first control signal line is connected to a gate of the capacitance control transistor of the first pixel and is not connected to any nodes in the second pixel, and
wherein the second control signal line is connected to the gate of the capacitance control transistor of the second pixel and is not connected to any nodes in the first pixel.

2. The imaging device according to claim 1, wherein in the one frame period, time when accumulation of charges for obtaining one of the first signal and the second signal of the first pixel is started is different from time when accumulation of charges for obtaining corresponding one of the first signal and the second signal of the second pixel is started.

3. The imaging device according to claim 1, wherein in the one frame period, time when accumulation of charges for obtaining the first signal of the first pixel ends is the same as time when accumulation of charges for obtaining the first signal of the second pixel ends.

4. The imaging device according to claim 1,
wherein in the one frame period, time when accumulation of charges for obtaining the first signal of the first pixel ends is the same as time when accumulation of charges for obtaining the first signal of the second pixel ends, and
wherein in the one frame period, time when accumulation of charges for obtaining the second signal of the first pixel ends is the same as time when accumulation of charges for obtaining the second signal of the second pixel ends.

5. The imaging device according to claim 1, wherein each of the first pixel and the second pixel further includes a color filter having the same spectral characteristics.

6. The imaging device according to claim 1,
wherein charges generated by the first photoelectric conversion unit and the second photoelectric conversion unit included in the first pixel and charges generated by the first photoelectric conversion unit and the second photoelectric conversion unit included in the second pixel are transferred to the input node of a common amplification circuit.

7. The imaging device according to claim 1, wherein the second signal is based on both charges generated by the first photoelectric conversion unit and charges generated by the second photoelectric conversion unit.

8. The imaging device according to claim 1,
wherein the accumulation time in which charges are accumulated for obtaining the one of the first signal and the second signal of the first pixel includes a first part and a second part,
wherein the first part of the accumulation time in which charges are accumulated for obtaining the one of the first signal and the second signal of the first pixel does not overlap with the accumulation time in which charges are accumulated for obtaining the corresponding one of the first signal and the second signal of the second pixel, and
wherein the second part of the accumulation time in which charges are accumulated for obtaining the one of the first signal and the second signal of the first pixel overlaps with the accumulation time in which charges are accumulated for obtaining the corresponding one of the first signal and the second signal of the second pixel.

9. The imaging device according to claim 1,
wherein a length of the accumulation time in which charges are accumulated for obtaining the one of the first signal and the second signal of the first pixel and a length of the accumulation time in which charges are accumulated for obtaining the corresponding one of the first signal and the second signal of the second pixel are different from each other in the one frame period.

10. An imaging system comprising:
the imaging device according to claim 1; and
a signal processing circuit configured to process signals output from the imaging device.

11. A mobile apparatus comprising:
the imaging device according to claim 1;
a distance information acquisition circuit configured to acquire distance information on a distance to an object, from a parallax image based on signals from the imaging device; and
a control circuit configured to control the mobile apparatus based on the distance information.

12. The imaging device according to claim 1,
wherein each of the plurality of pixels further includes a select transistor configured to control connection or disconnection between the amplification circuit and the readout circuit,
wherein the control signal line group further includes a third control signal line that is connected to a gate of the select transistor, and
wherein the number of transistors to which a single first control signal line is connected is less than the number of transistors to which a single third control signal line is connected.

13. The imaging device according to claim 12, wherein the number of transistors to which a single second control signal line is connected is less than the number of transistors to which the single third control signal line is connected.

* * * * *